March 24, 1936. J. W. HERNLUND ET AL 2,034,903
DUPLICATOR
Filed March 1, 1934 20 Sheets-Sheet 1

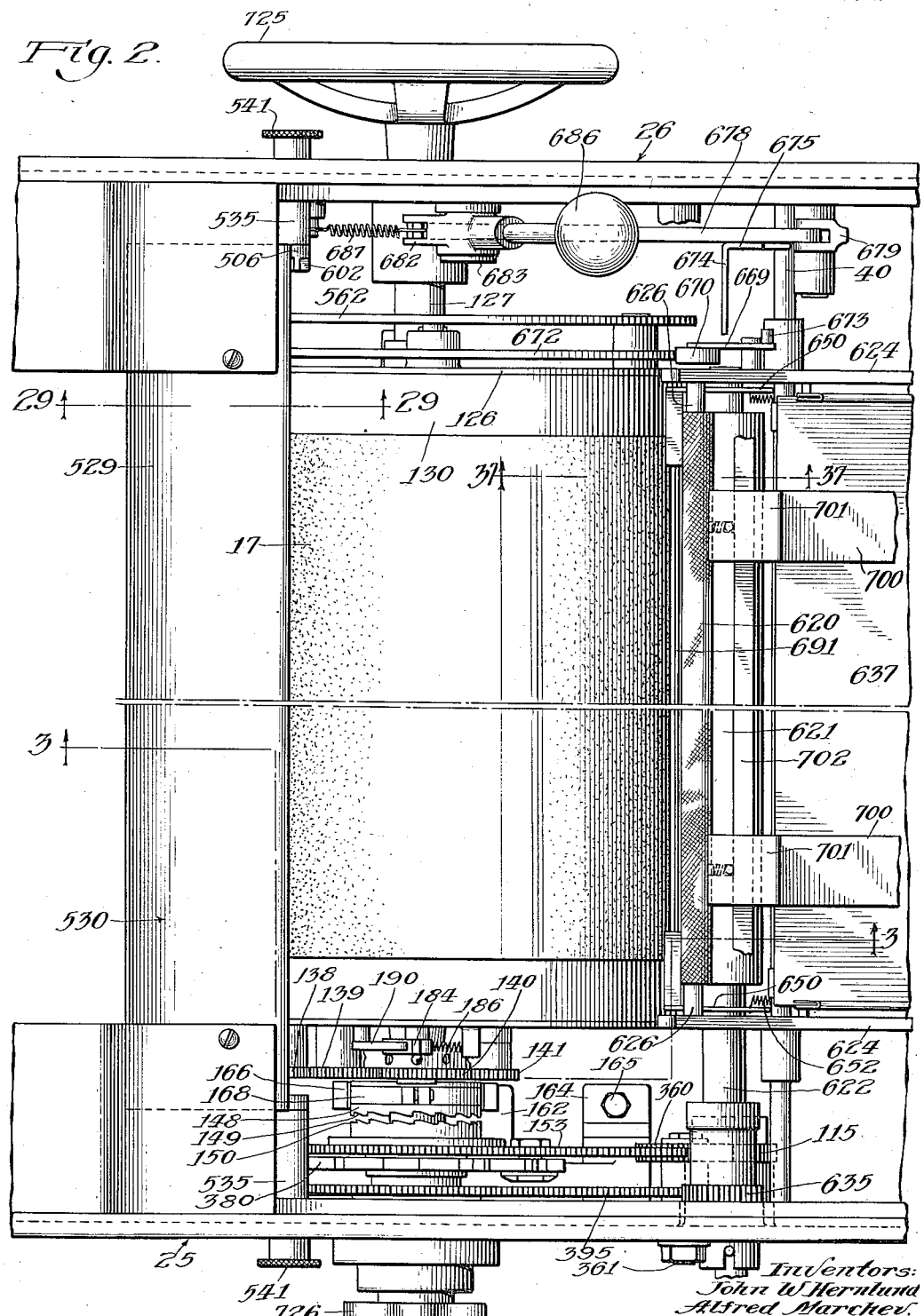

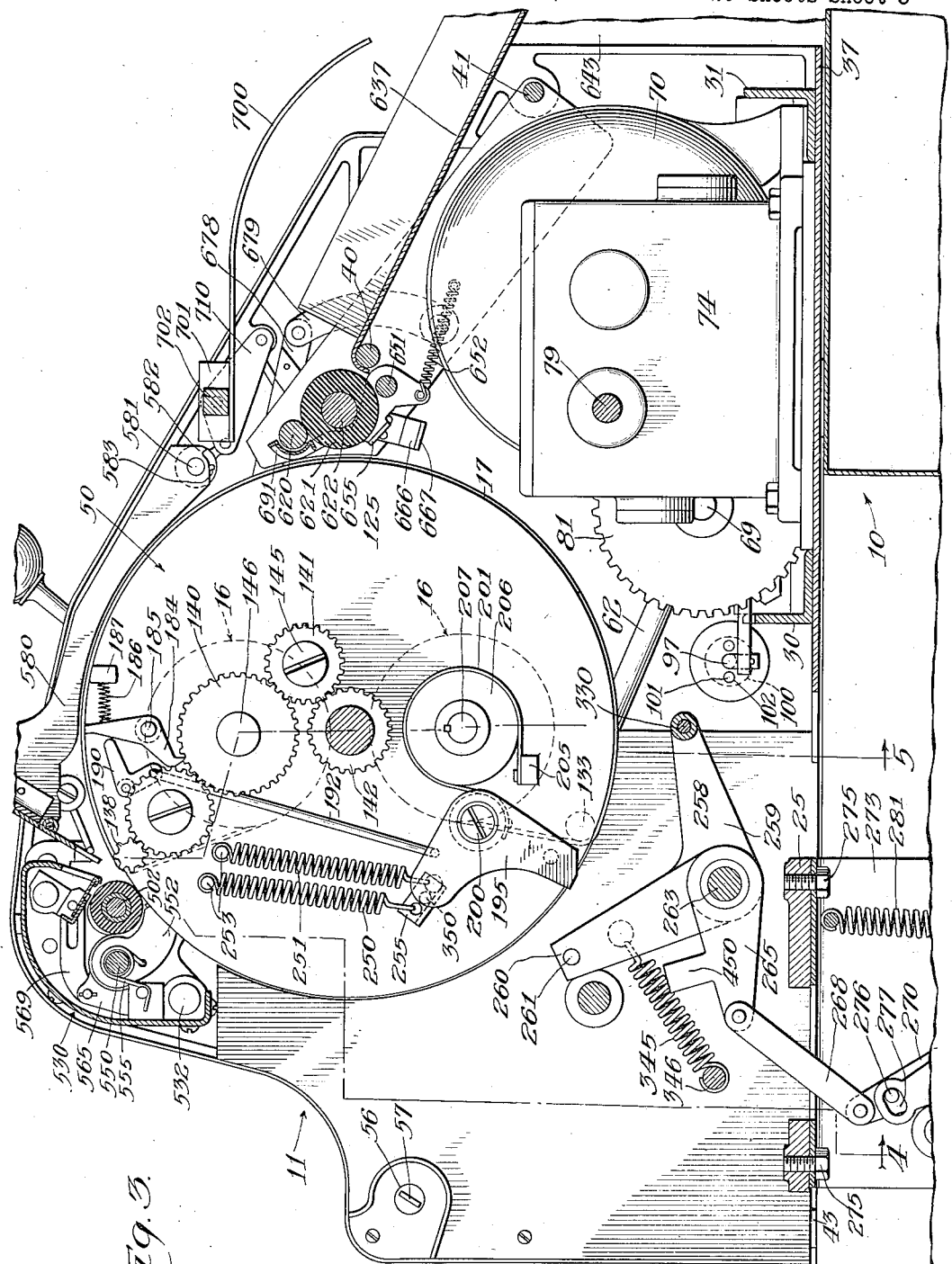

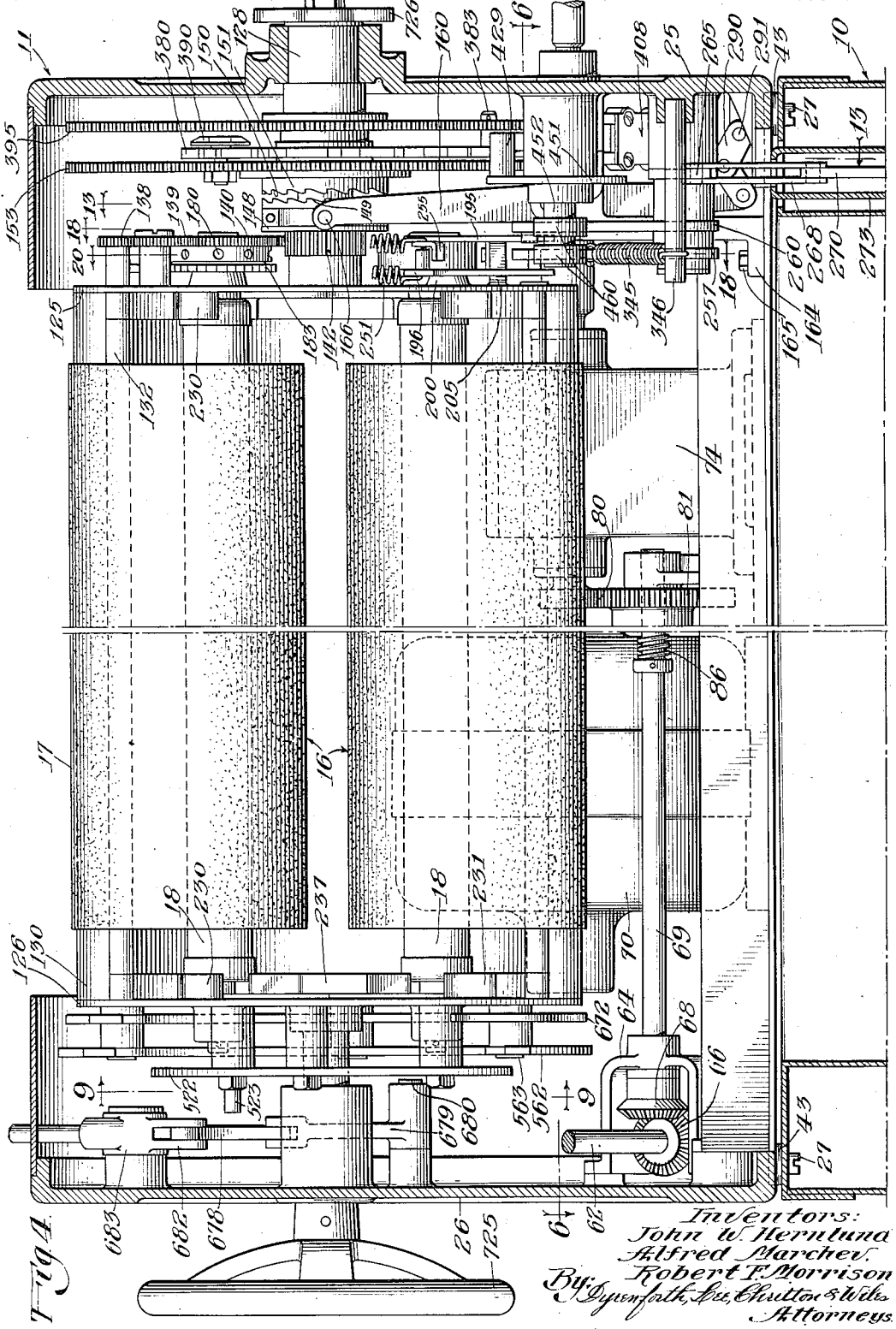

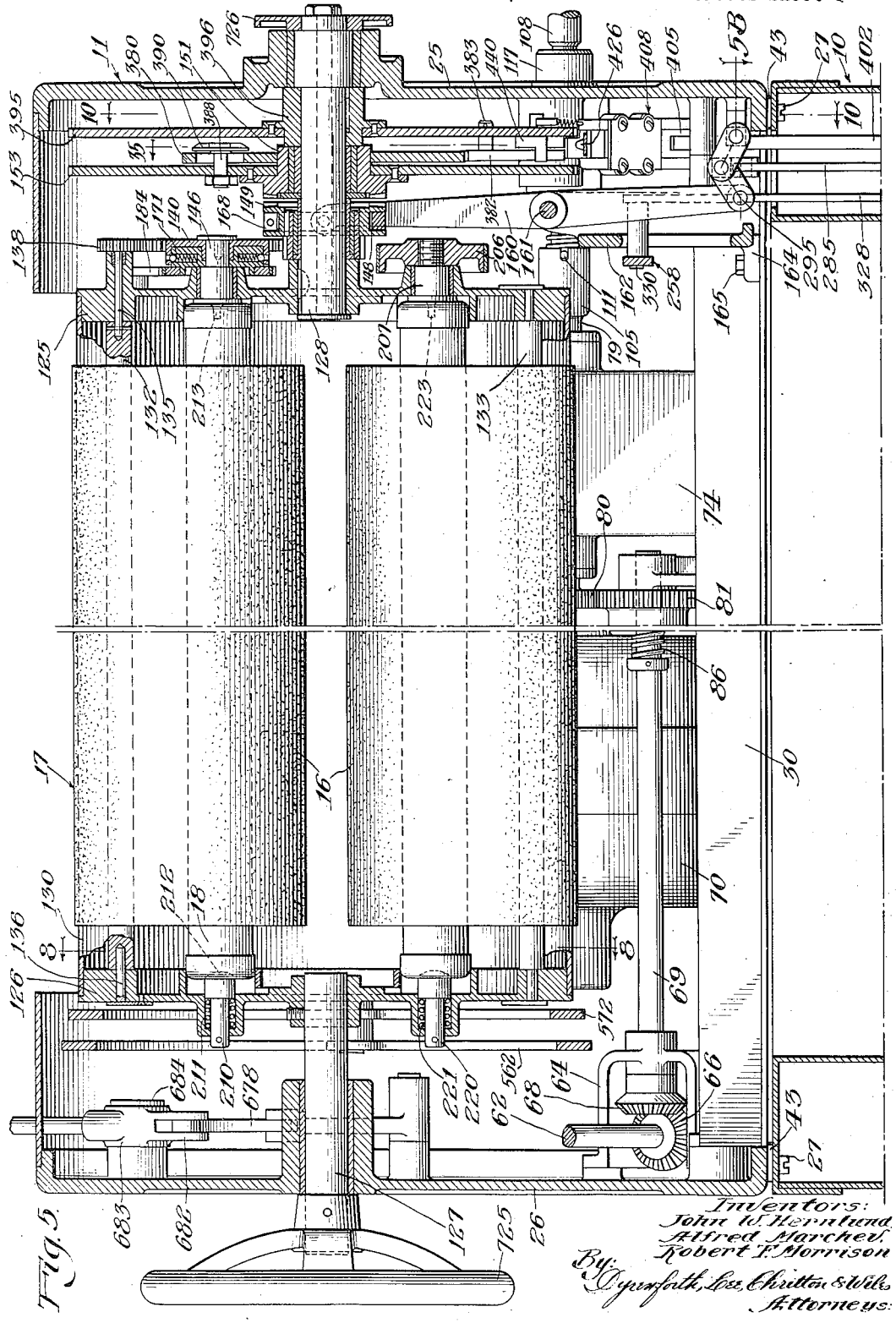

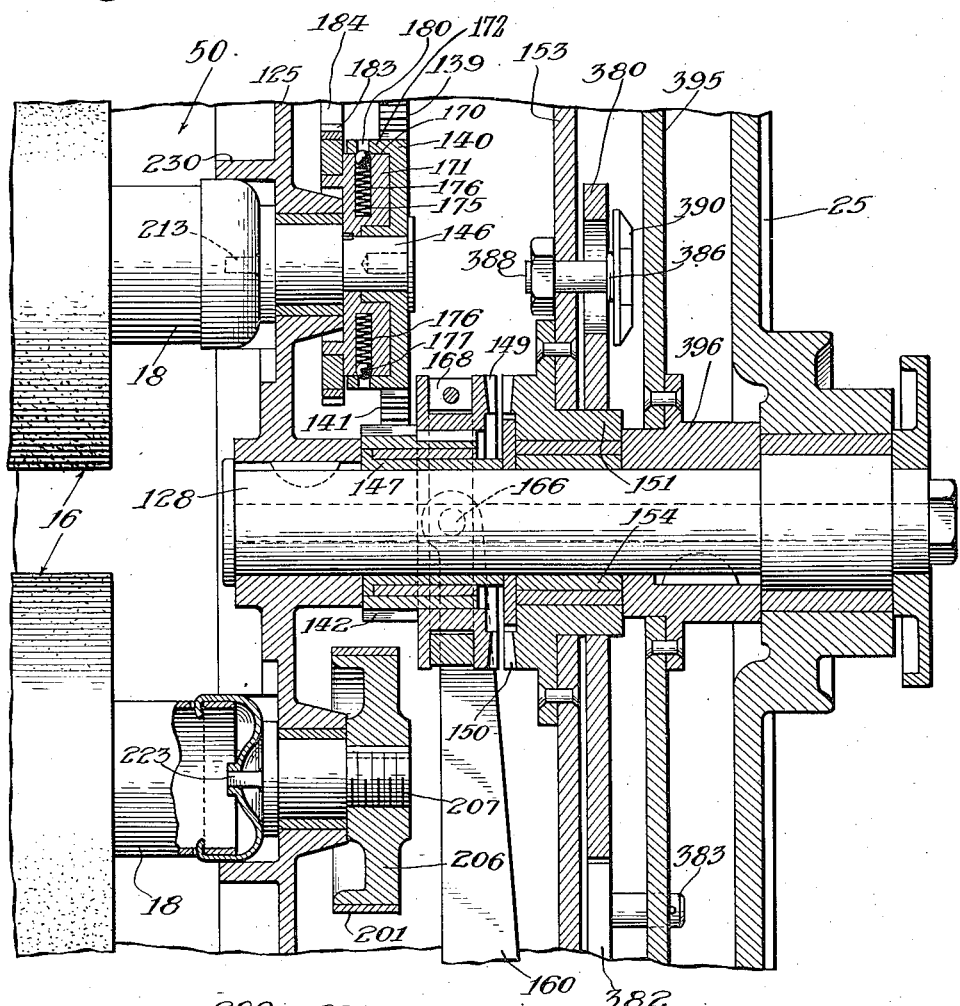
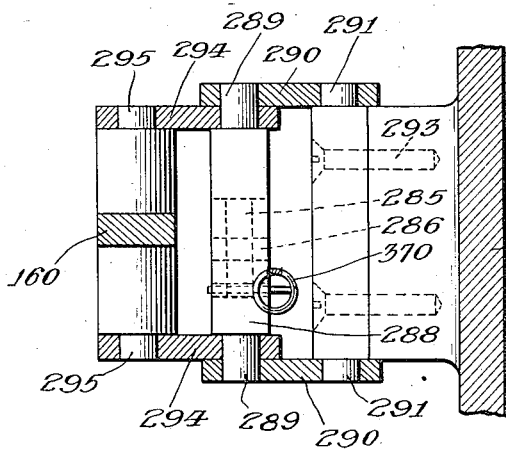

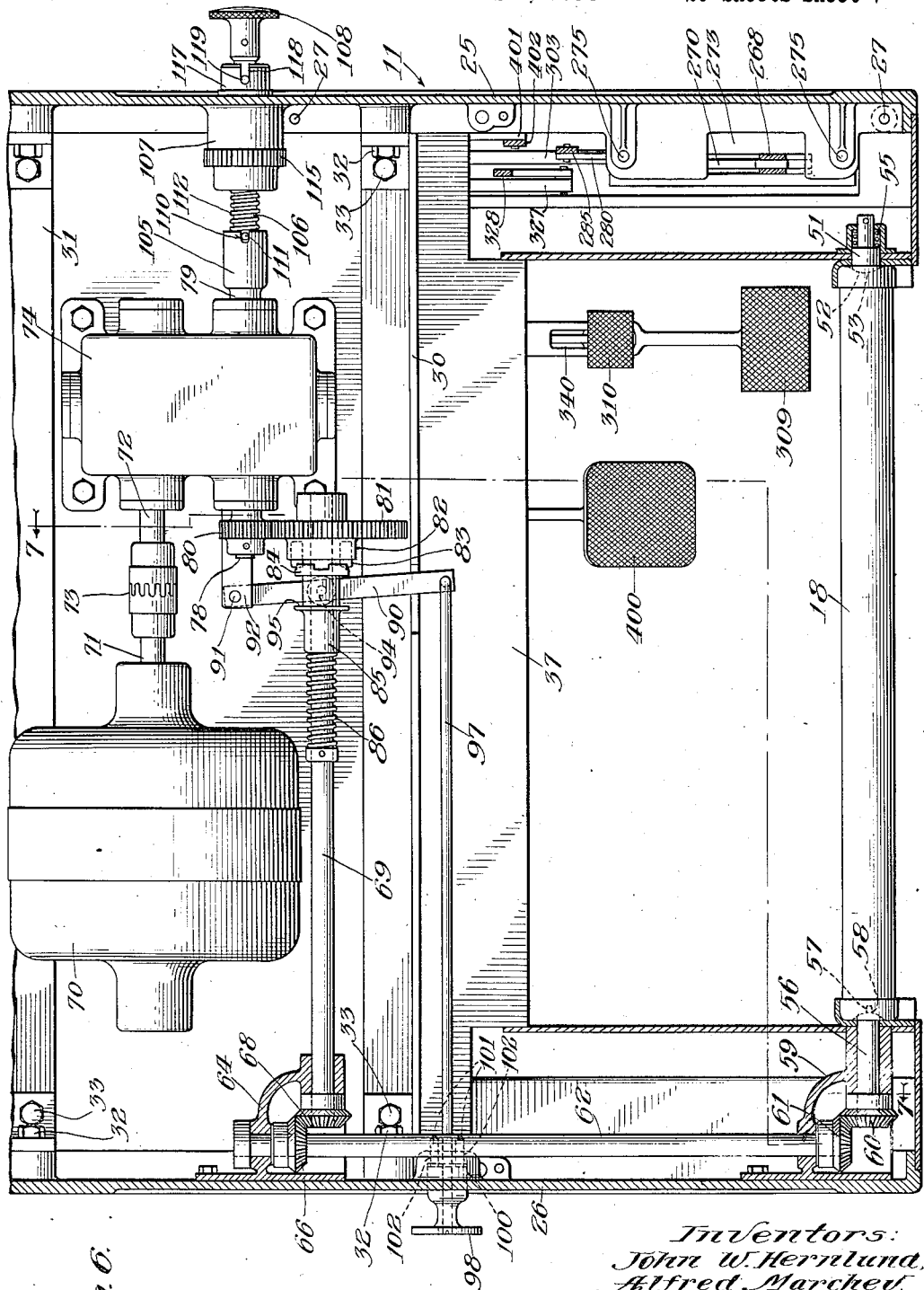

March 24, 1936. J. W. HERNLUND ET AL 2,034,903
DUPLICATOR
Filed March 1, 1934 20 Sheets-Sheet 8

Inventors:
John W. Hernlund,
Alfred Marchev,
Robert F. Morrison
By Dyrenforth, Lee, Chritton & Wiles
Attorneys

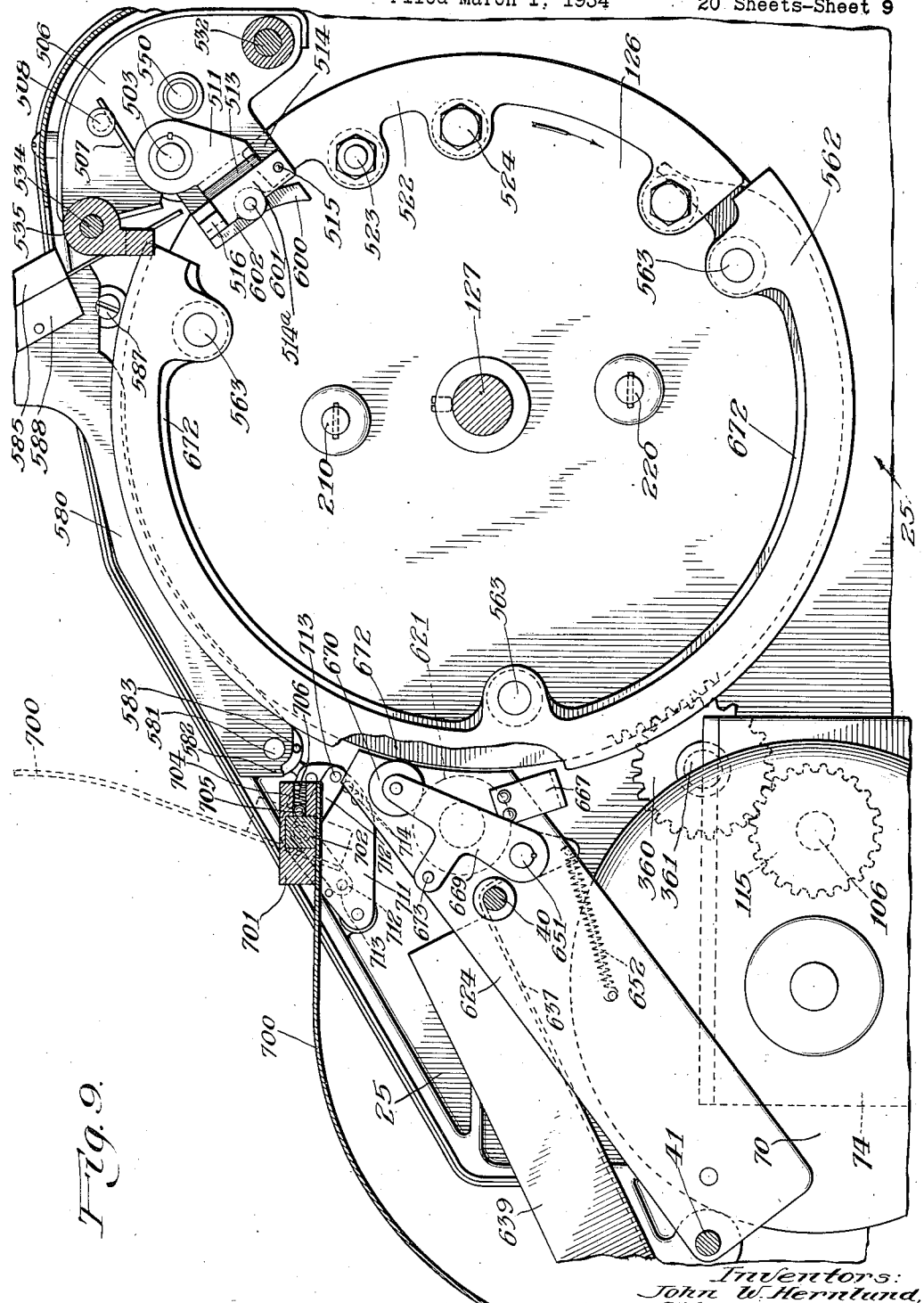

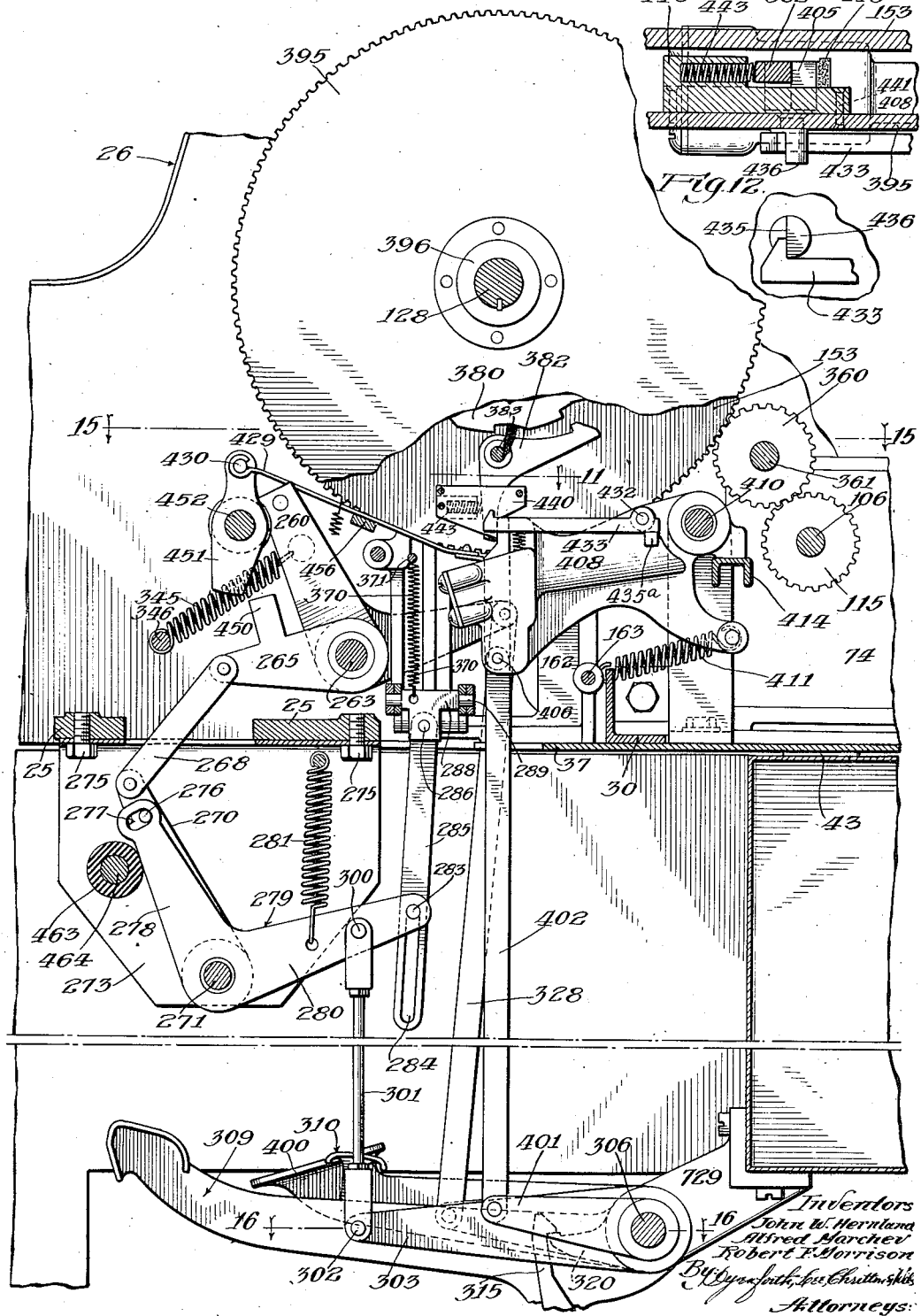

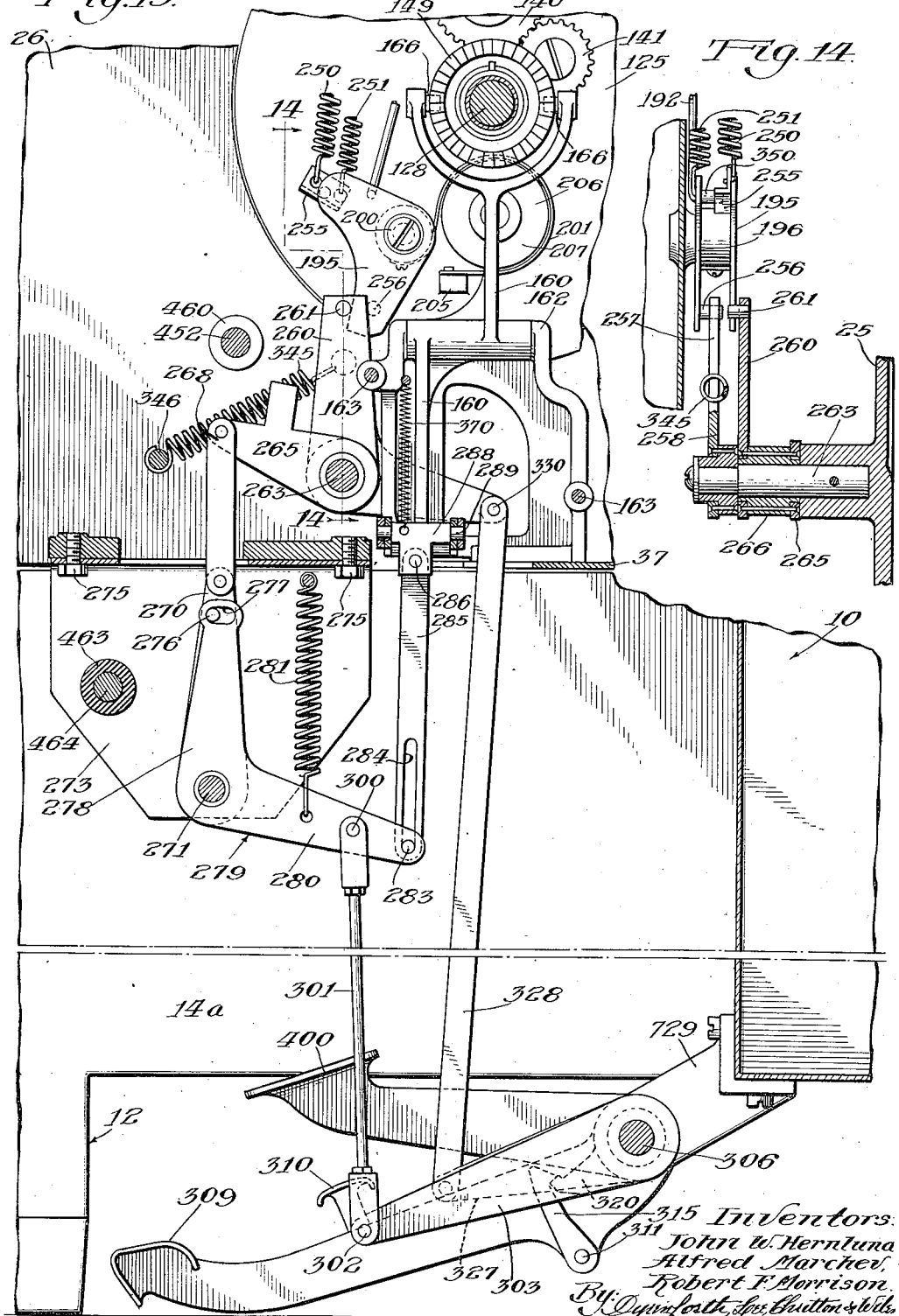

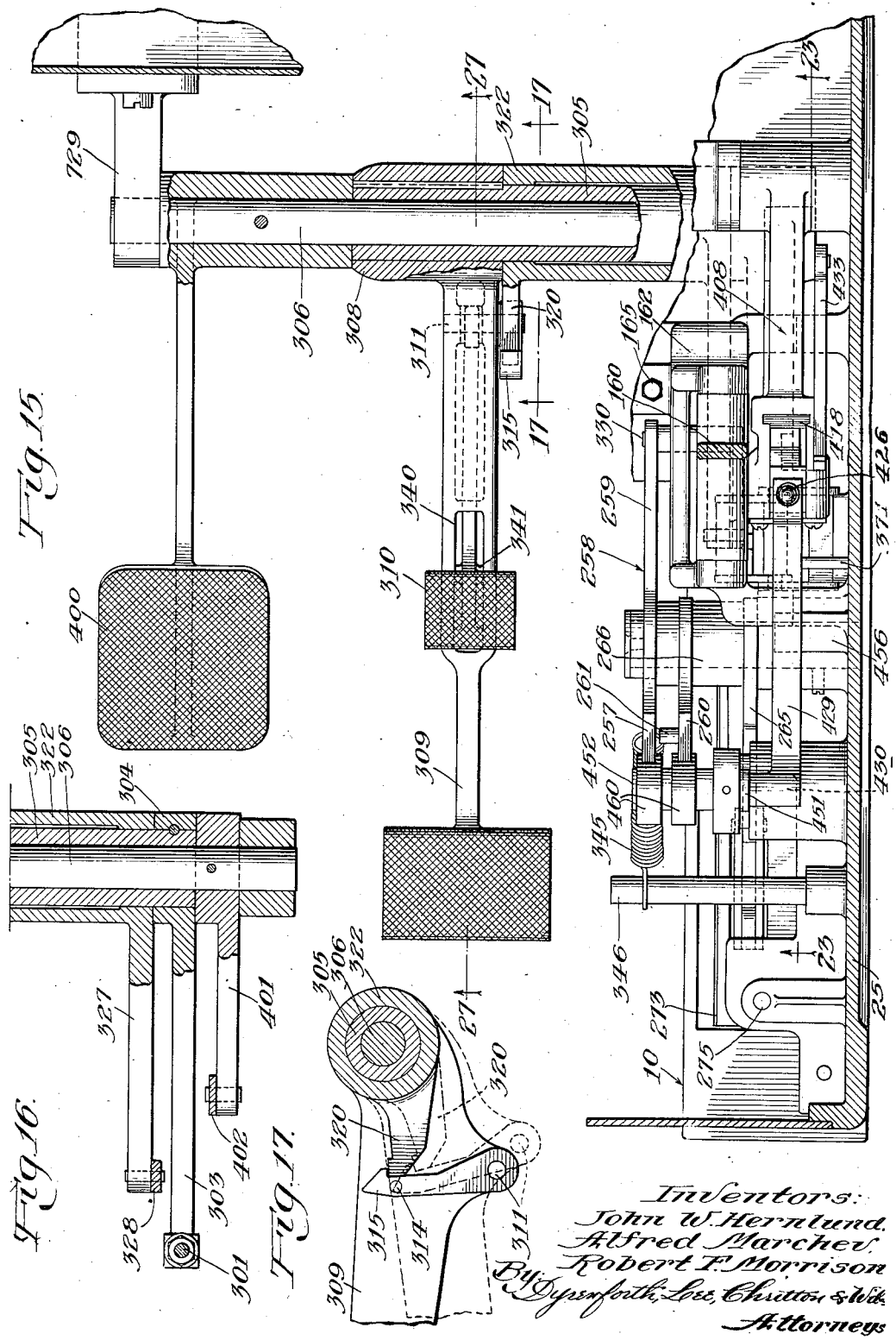

March 24, 1936.  J. W. HERNLUND ET AL  2,034,903
DUPLICATOR
Filed March 1, 1934  20 Sheets-Sheet 13
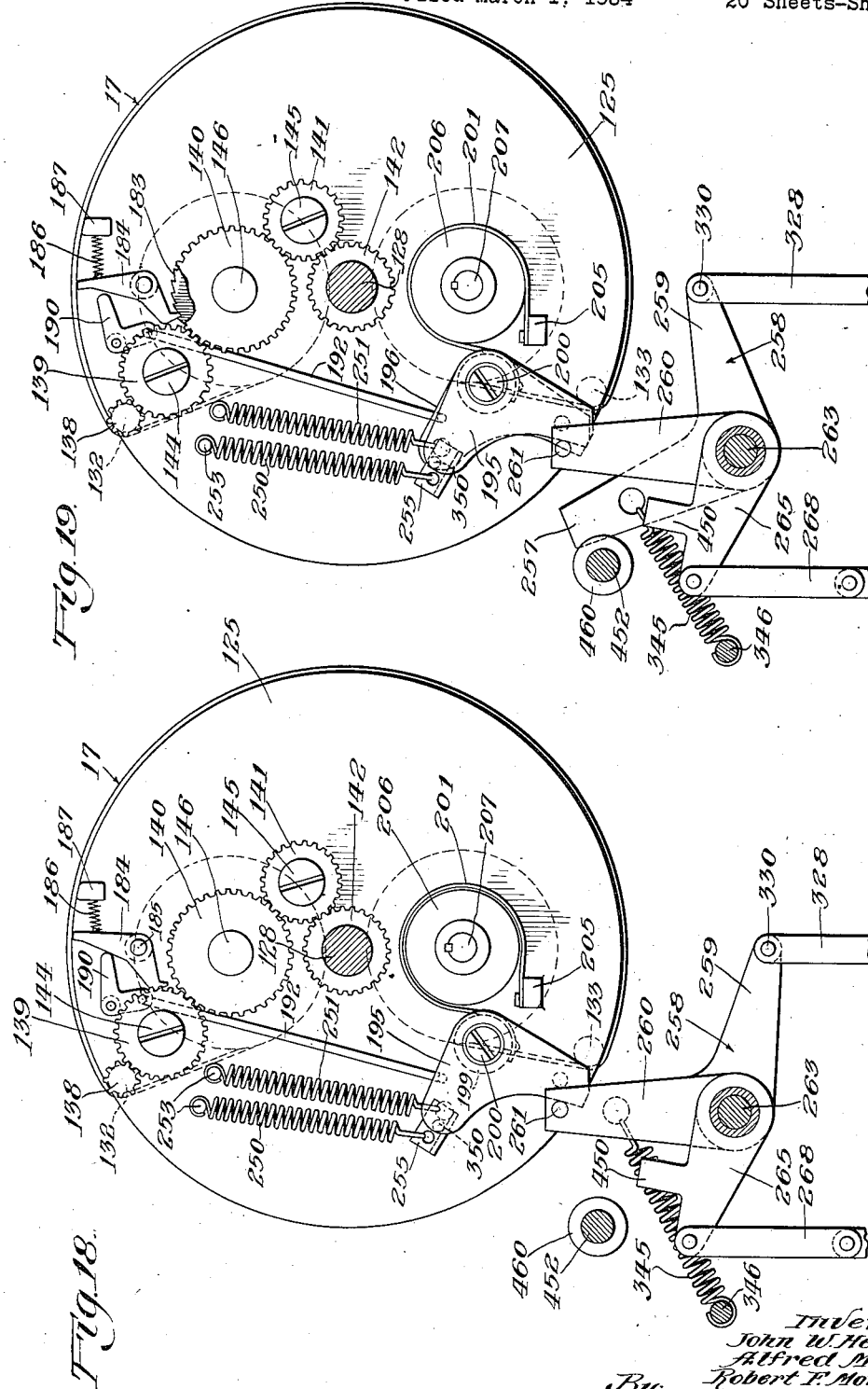

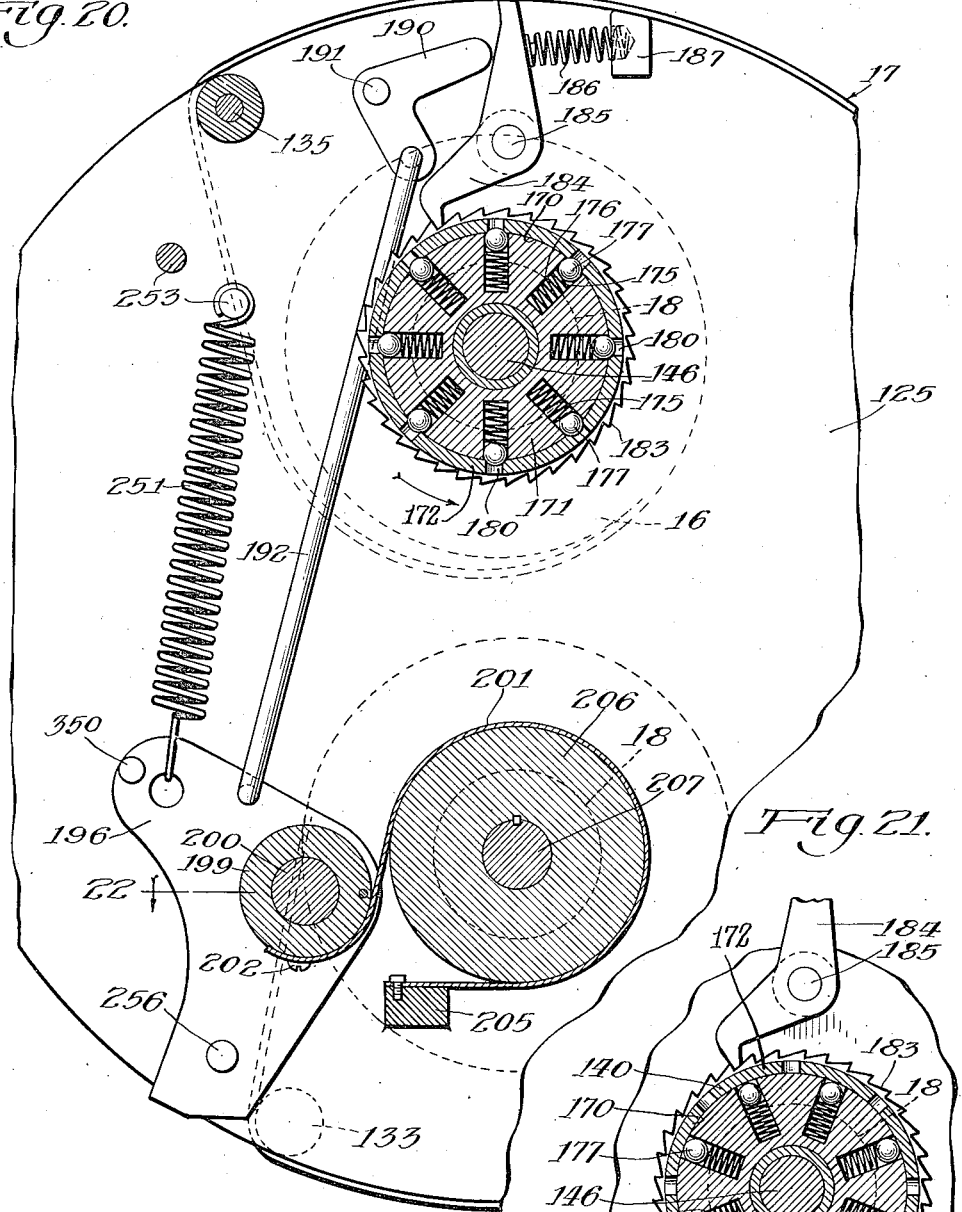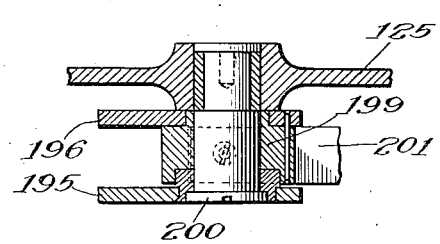

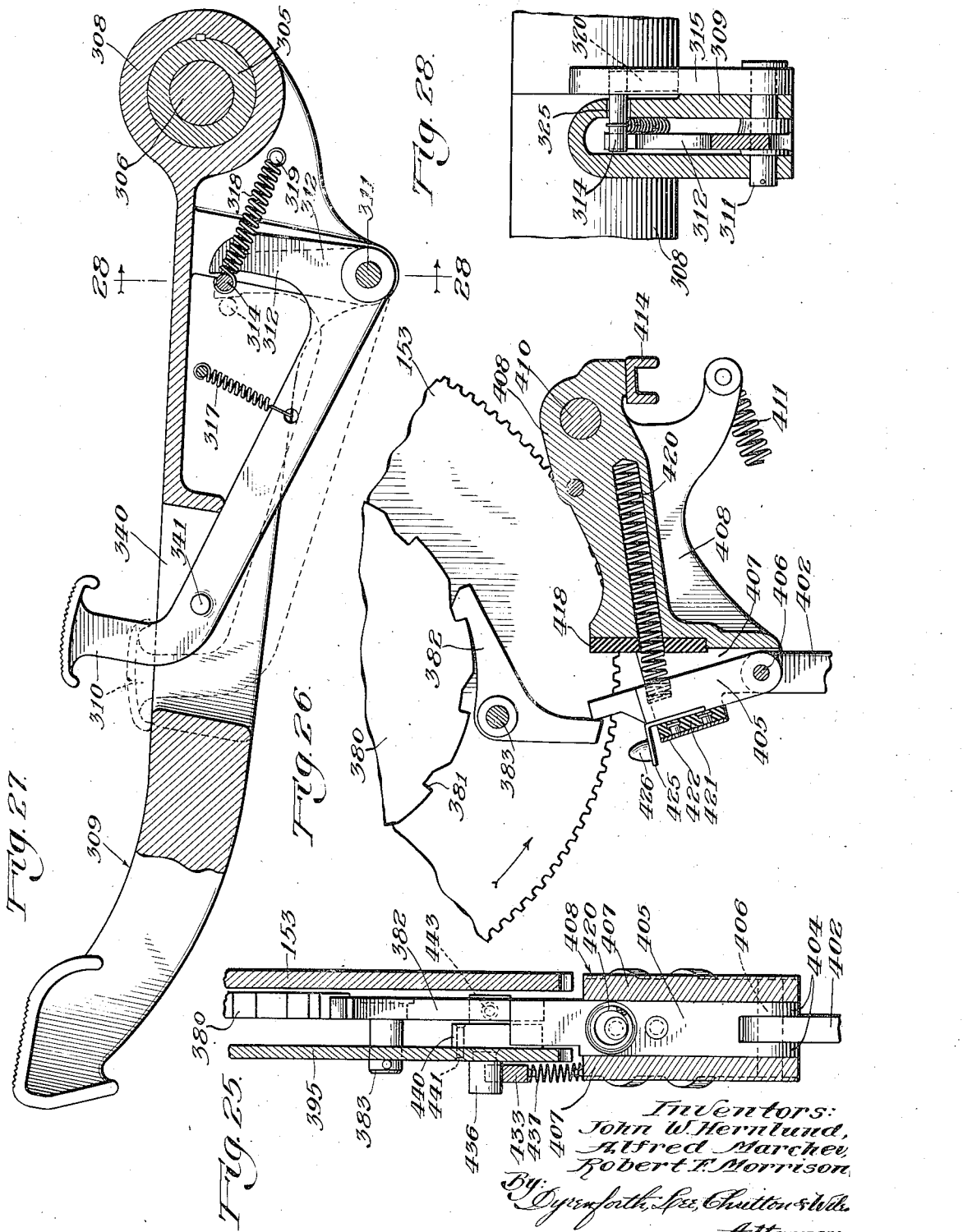

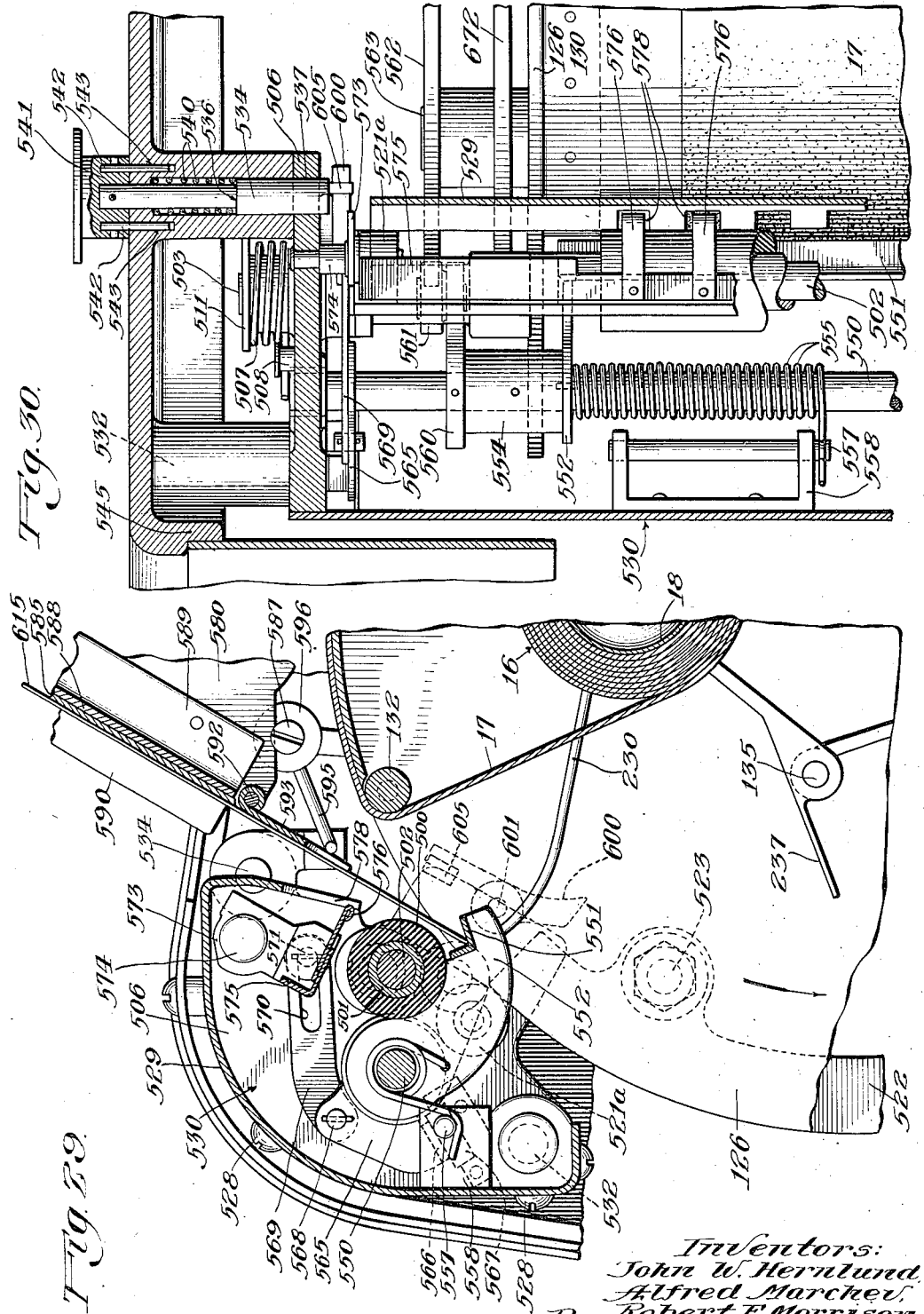

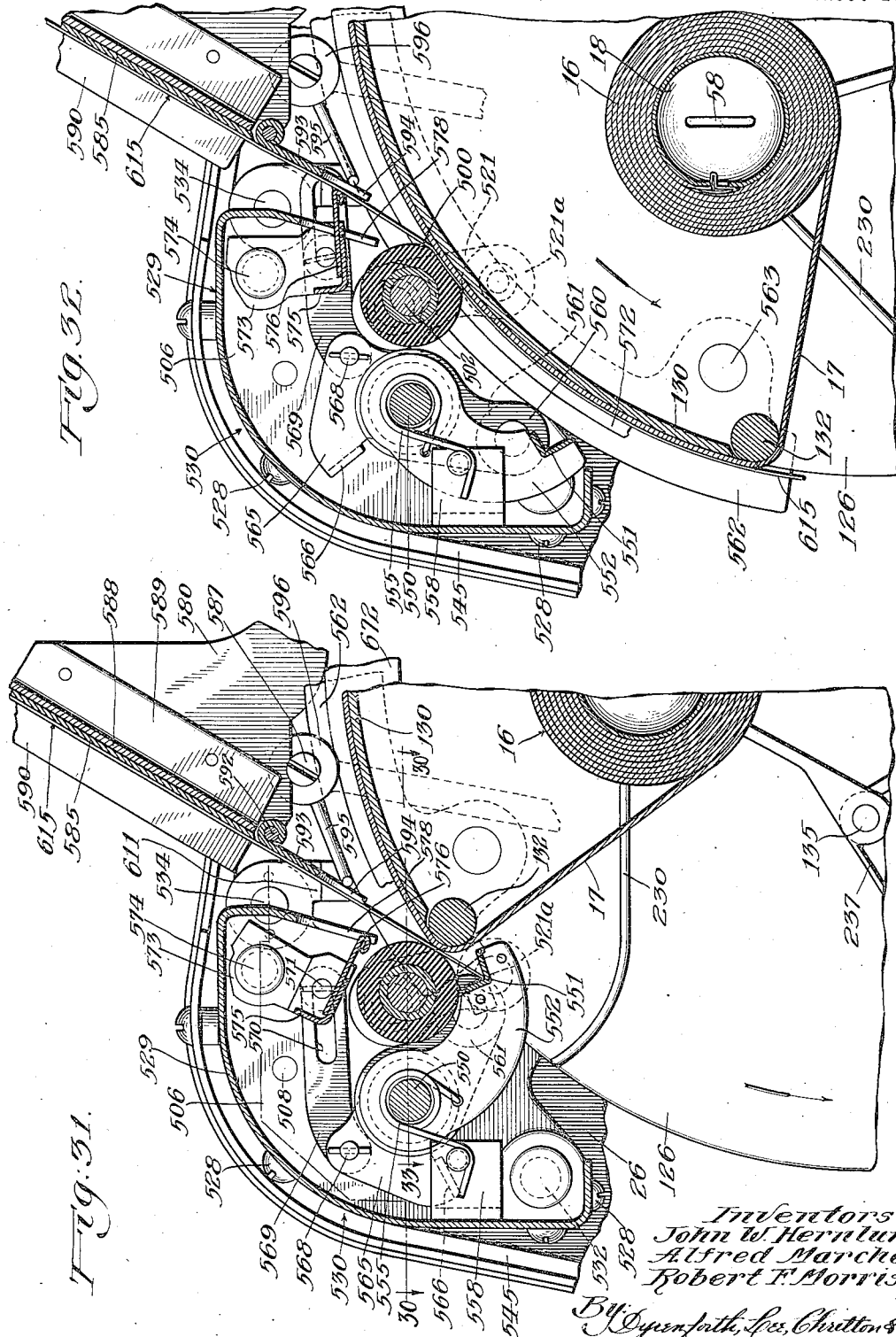

March 24, 1936.  J. W. HERNLUND ET AL  2,034,903
DUPLICATOR
Filed March 1, 1934  20 Sheets-Sheet 19
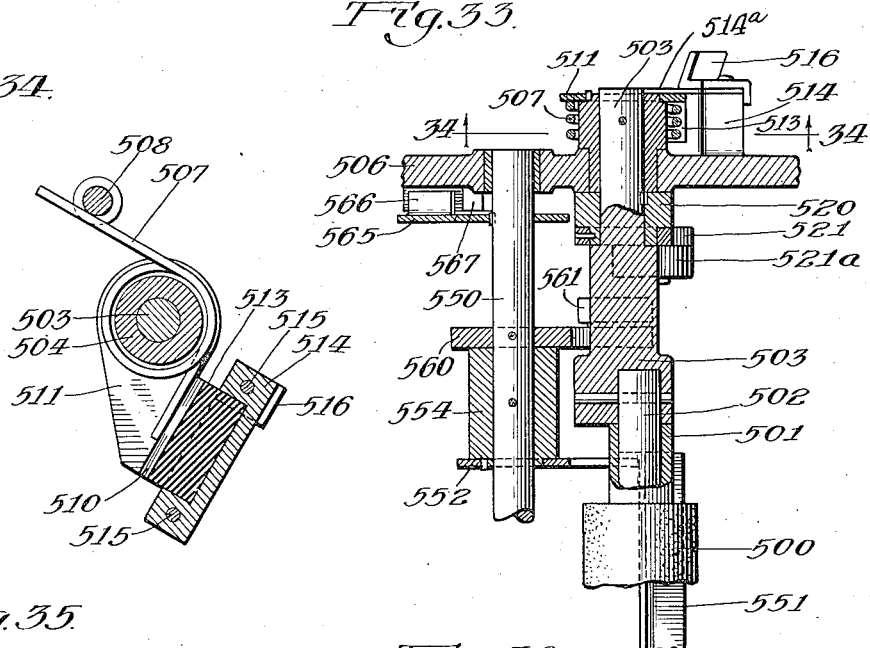
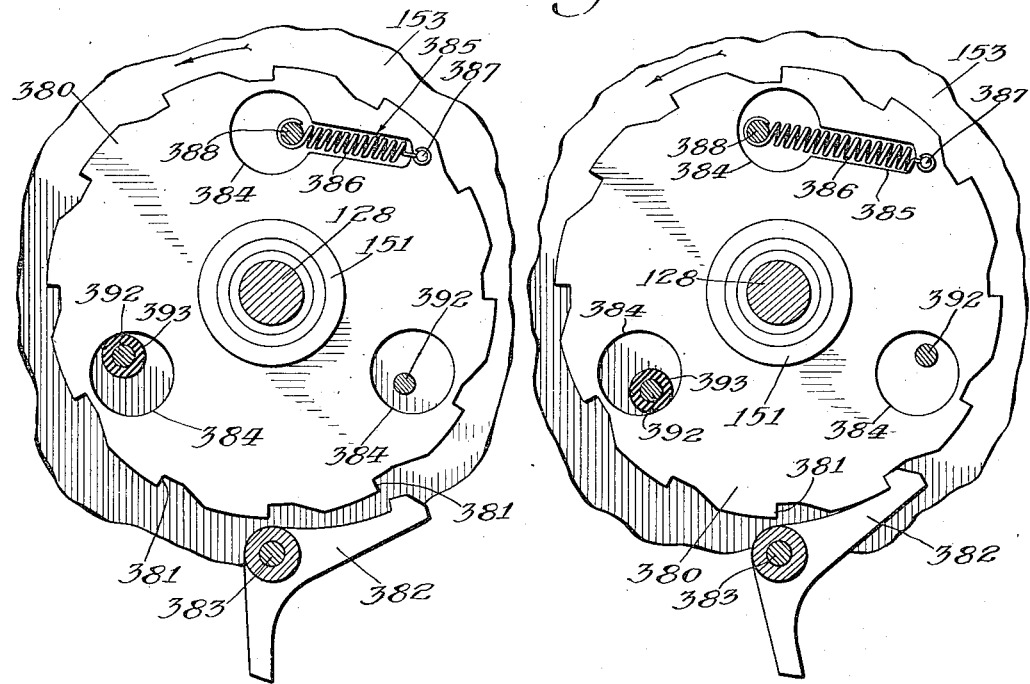
Inventors:
John W. Hernlund,
Alfred Marchev,
Robert F. Morrison
By Dyrenforth, Lee, Chritton & Wiles
Attorneys March 24, 1936.  J. W. HERNLUND ET AL  2,034,903
DUPLICATOR
Filed March 1, 1934   20 Sheets-Sheet 20

Inventors
John W. Hernlund
Alfred Marchev
Robert F. Morrison
By Dyrenforth, Lee, Chritton & Wiles
Attorneys.

Patented Mar. 24, 1936

2,034,903

UNITED STATES PATENT OFFICE 2,034,903

DUPLICATOR

John W. Hernlund and Alfred Marchev, La Grange, and Robert F. Morrison, Oak Park, Ill., assignors to Ditto Incorporated, a corporation of West Virginia Application March 1, 1934, Serial No. 713,590

28 Claims. (Cl. 101—132)

The invention relates to duplicators of the type shown in the co-pending application, Serial No. 640,560, filed October 31, 1932 by Alfred Marchev.

While the invention is disclosed in connection with a duplicator of the hectograph type, it is to be understood that certain features of the invention may be employed with advantage in duplicating machines of other types and in printing devices as a general class. Also, while the invention is disclosed in connection with a duplicating machine of the rotary type, it is to be understood that certain features of the invention may be employed with advantage in duplicating machines of the flat bed type and in duplicating machines comprising stationary duplicating drums. In duplicating machines of the stationary drum type, one or more platen rollers are preferably provided to apply the copy sheet to the duplicating drum.

The duplicating machine embodying the present invention has certain features not found in the duplicating machine disclosed in the co-pending application identified above. The paper feeding means, the paper stripping means, the means for rotating the duplicating drum and the means for advancing and stretching the hectograph band have been improved in the machine disclosed in this application. The improved machine is adapted to handle substantially the same work that may be handled by the machine disclosed in the application identified above.

Machines of the type disclosed in this application and in the application identified above have been called "system rotary" machines as they are adapted for system work. The machines are adapted to duplicate sales data, cost data, engineering data and other statistics on forms which may or may not be of the same size. Generally, a relatively small number of duplicate copies are made and it is essential that the machines should be capable of handling this class of work rapidly and to a large extent, automatically.

The improved paper feeding mechanism comprises a margin bar to which the paper to be duplicated is advanced or gravitates. The platen roller is disposed intermediate the margin bar and the feed table. With this construction, the sheets to be duplicated will be registered accurately with the duplicating surface even though the sheets vary in thickness. In constructions wherein feed rollers advance the sheets to be duplicated directly to the platen roller, the feed rollers are generally movable bodily away from each other to receive the sheet between them. Then when they approach the sheet, the thickness of the sheet determines when the feeding operation begins. The thicker the sheet, the earlier it will be advanced to the platen roller and the registration of the sheet will therefore vary with the thickness of it.

The improved stripping means for stripping the copy sheets or the duplicated sheets from the hectograph band comprises a relatively light member which enters the opening in the duplicating drum and deflects the leading edge of the duplicated sheet to a pair of stripping rollers. The small weight of the deflecting member permits it to operate at high speed with little or no noise and also does not cause the machine to vibrate.

The means for driving the duplicating drum from the electric motor comprises a spring through which the power is transmitted to the drum. This spring yields when the load of the drum is placed on the motor and absorbs the attendant shock.

Other objects and features of the invention will become apparent from the following description, reference being had to the accompanying drawings, in which—

Fig. 2 is a fragmentary plan view of the improved duplicator.

Fig. 3 is a section taken on line 3—3 of Fig. 2.

Fig. 4 is a section taken on line 4 of Fig. 3.

Fig. 5 is a section taken on line 5 of Fig. 3.

Fig. 5A is an enlarged fragmentary section taken on the same line as Fig. 5.

Fig. 5B is an enlarged fragmentary section taken on line 5B of Fig. 5.

Fig. 6 is a section taken on line 6—6 of Fig. 4.

Fig. 9 is a section taken on line 9—9 of Fig. 4.

Fig. 10 is a section taken on line 10—10 of Fig. 5.

Fig. 11 is a section taken on line 11 of Fig. 10.

Fig. 12 is a fragmentary side elevation of some of the mechanism shown in Fig. 11.

Fig. 13 is a section taken on line 13—13 of Fig. 4.

Fig. 14 is a section taken on line 14—14 of Fig. 13.

Fig. 15 is a section taken on line 15—15 of Fig. 10.

Fig. 16 is a section taken on line 16—16 of Fig. 10.

Fig. 17 is a section taken on line 17—17 of Fig. 15.

Fig. 18 is a section taken on line 18—18 of Fig. 4.

Fig. 19 is a section taken on the same line as Fig. 18 but showing certain mechanism in a changed position.

Fig. 20 is a section taken on line 20 of Fig. 4.

Fig. 21 is a section taken on the same line as Fig. 20 but shows certain mechanism in a changed position.

Fig. 22 is a section taken on line 22—22 of Fig. 20.

Fig. 25 is a section taken on line 25—25 of Fig. 23.

Fig. 26 is a fragmentary section taken on the same line as Figs. 23 and 24 but showing certain mechanism in a changed position.

Fig. 27 is a section taken on line 27—27 of Fig. 15.

Fig. 28 is a section taken on line 28—28 of Fig. 27.

Fig. 29 is a section taken on line 29—29 of Fig. 2.

Fig. 30 is a section taken on line 30—30 of Fig. 31.

Fig. 32 is a section taken on the same line as Figs. 29 and 31 but showing certain mechanism in a changed position.

Fig. 33 is a section taken on line 33—33 of Fig. 31.

Fig. 34 is a section taken on line 34—34 of Fig. 33.

Fig. 35 is a section taken on line 35—35 of Fig. 5.

Fig. 36 is a section taken on the same line as Fig. 35 but showing certain mechanism in a changed position.

Fig. 37 is a section taken on line 37—37 of Fig. 2, and

Figure 1:
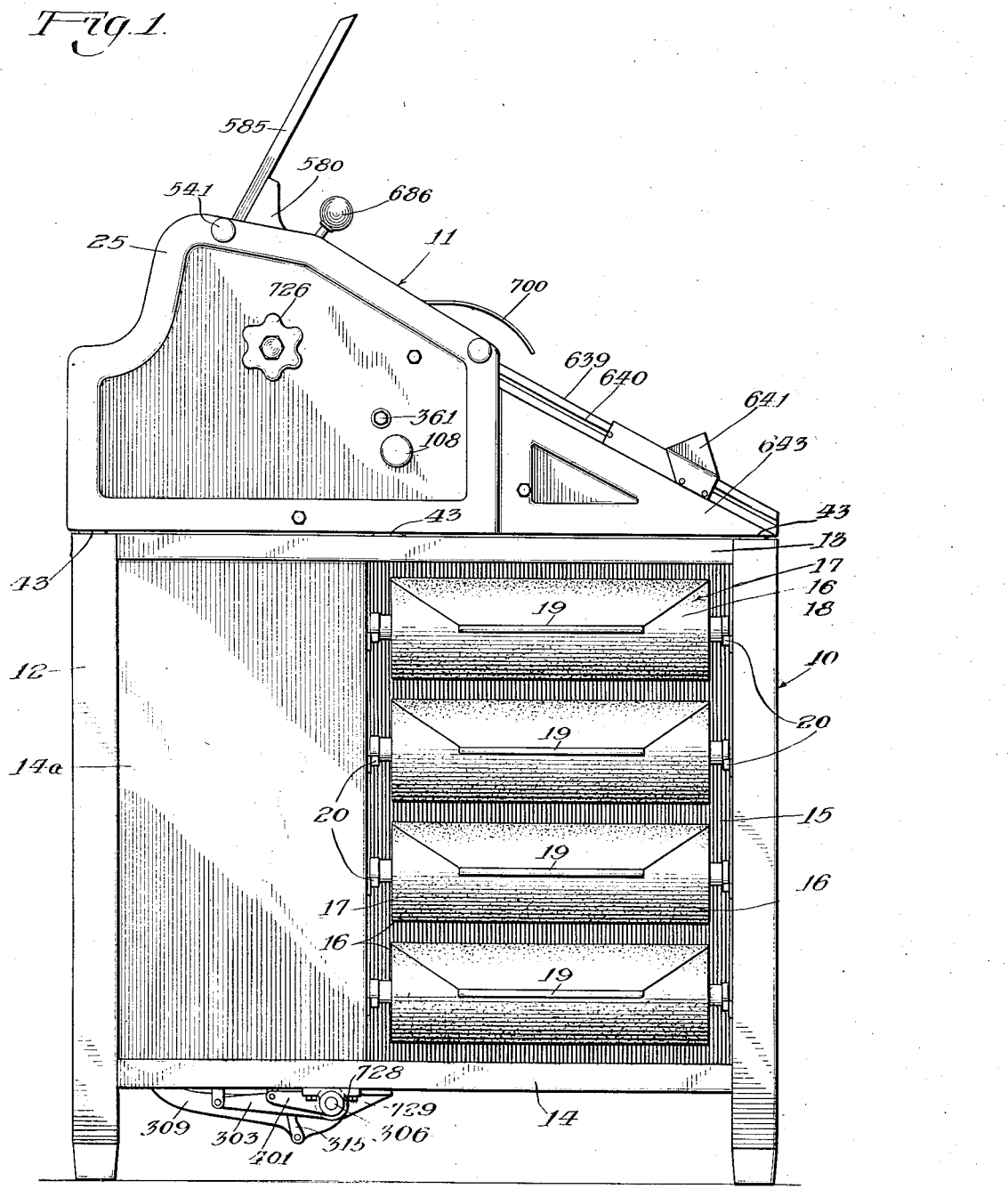
Fig. 1 is a side elevation of a duplicating machine which embodies the invention.

Referring for the present to Figs. 1, 2, and 5, it will be noted that the improved duplicating machine preferably comprises a cabinet 10 upon which a frame 11 is mounted, the duplicating mechanism proper being mounted in the frame 11. The cabinet 10 is preferably constructed mainly from sheet metal, the sheet metal being formed to provide four legs 12 and horizontally extending bars 13 and 14 at the upper and lower ends of the cabinet. The two sides of the cabinet 10 are closed by sheet metal panels 14a, each of which is recessed as at 15 to provide room for storing a plurality of duplicating rolls 16. Each duplicating roll 16 comprises a gelatinized band 17 which has one end detachably secured to a spindle 18, the other end being provided with a fastening device or clip 19 whereby it may be secured detachably to a second spindle which is preferably identical in construction with the spindle 18. It will be noted that the ends of the spindles 18 rest on angle irons 20 mounted in the recesses 15.

The frame 11 comprises side frames 25 and 26 which are secured detachably to the cabinet 10 by means including bolts 27 (Figs. 3, 6, and 15).

At their rear ends, the side frames 25 and 26 are secured to each other by angle irons 30 and 31, the angle irons being secured to the side frames by means including bolts 32 (Figs. 3 and 6). A plurality of bolts 33 secure the angle irons 30 and 31 to the cabinet 10. It will be noted that a plate 37 disposed between the upper surface of the cabinet 10 and the angle irons 30 and 31 is secured to the angle irons by the bolts 33. The frame 11 also comprises tie rods 40 and 41 (Figs. 2 and 3).

As best shown in Figs. 4 and 5, cushioning pads of rubber 43 are disposed between the top surface of the cabinet 10 and the side frames 25 and 26. This construction tends to make the machine substantially noiseless in operation.

Figure 8:
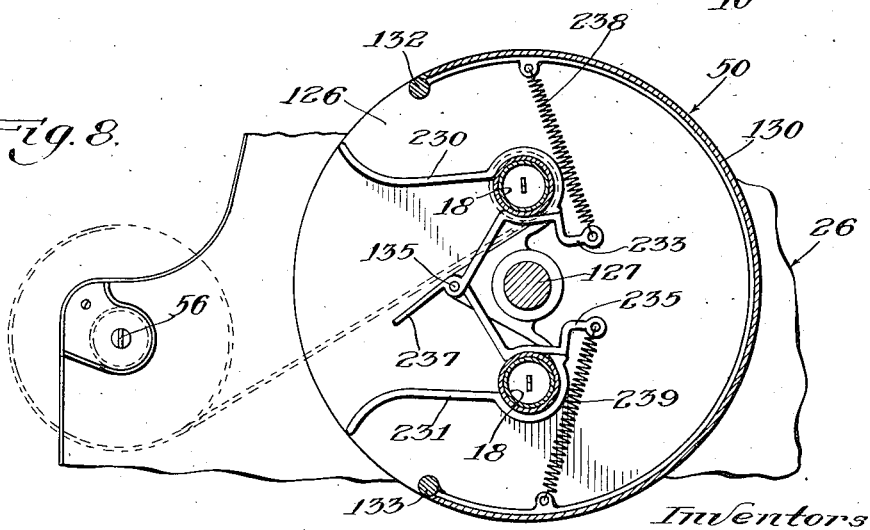
Fig. 8 is a section taken on line 8—8 of Fig. 5.

Referring to Figs. 3, 6, and 8, it will be noted that the side frames 25 and 26 are provided with means for journaling one of the spindles 18 when a fresh hectograph band is to be mounted on a duplicating drum which is designated generally by the reference character 50. The journaling means comprises a pin 51 provided with a convex surface 52 which fits snugly in one of a pair of concave surfaces 53 formed in the ends of the spindle 18, the spindle 18 being preferably of the construction illustrated in the co-pending application, Serial No. 692,679, filed October 7, 1933, by Alfred Marchev and John W. Hernlund. The pin 51 is urged toward the spindle 18 by a spring 55. It is readily understood that the pin 51 journals the right hand end (Fig. 6) of the spindle 18. The left hand end (Fig. 6) of the spindle 18 is alined with a shaft 56 provided with a tongue 57 which projects into a slot 58 provided in the adjacent end of the spindle. The tongue 57 is adapted to drive the spindle 18 when the shaft 56 is driven. It may be mentioned that both of the ends of the spindle 18 are provided with slots 57 so that the ends of the spindle are interchangeable. The shaft 56 is journaled in a bracket 59 secured to the inner side of the side frame 26. A bevel gear 60 meshes with a bevel gear 61 fixed to a shaft 62 which has one of its ends journaled in the bracket 59. The other end of the shaft 62 is journaled in a bracket 64 secured to the inner side of the side frame 26. A bevel gear 66 fixed to the shaft 62 adjacent the bracket 64 meshes with a bevel gear 68 fixed to a shaft 69 adapted to be driven by means including an electric motor 70.

The electric motor 70 is mounted above and secured to the plate 37. The shaft 71 of the motor 70 is connected to a shaft 72 by a coupling member 73. The shaft 72 forms part of speed reduction gearing disposed in a housing 74 which is mounted upon the plate 37. Shafts 78 and 79 projecting from the housing 74 are driven by the speed reduction gearing when the shaft 72 is driven by the motor 70. Pinned to the shaft 78 is a pinion 80 which meshes with a gear 81 journaled on the shaft 69. A hub 82 formed integral with the gear 81 is provided with clutch jaws 83 engageable with clutch jaws 84 provided upon a clutch collar 85 splined on the shaft 69. The clutch collar 85 is urged to the right (Fig. 6) by a spring 86 disposed around the shaft 69. The clutch collar 85 is controlled by means including a lever 90 pivoted at 91 to a bar 92 secured to the plate 37. A roller 94 mounted on the lever 90 engages an annular groove 95 formed in the collar 85. The free end of the lever 90 is pivoted to one end of a push rod 97 which extends through the side frame 26 and is provided at its outer end with a knob 98, the knob 98 being rotatably mounted upon the rod 97. When the apparatus is adjusted as illustrated in Fig. 6, the knob 98 projects into a cylindrical depression 100 formed in the side frame 26 and a pair of pins 101 projecting from the knob 98 pass through holes 102 formed in the side frame 26. The construction is such that the operator may grasp the knob 98 and pull it and the rod 97 towards the left (Fig. 6) against the action of the spring 86 and after the pins 101 have been withdrawn from the holes 102, the knob 98 may be rotated through a small angle to bring the pins 101 out of alinement with the holes 102 whereupon the pins 101 will rest upon the bottom surface of the depression 100 and hold the rod 97 and the lever 90 in positions wherein they hold the clutch jaws 84 out of engagement with the clutch jaws 83. To re-engage the clutch jaws 84 with the clutch jaws 83, it is only necessary to give the knob 98 a slight turn so that the pins 101 will register with the holes 102 whereupon the spring 86 will elongate and displace the clutch collar 85 to the right (Fig. 6) so that the clutch jaws 84 will engage the clutch jaws 83. When the clutch jaws 83 engage the clutch jaws 84, the spindle 18 mounted between the shaft 56 and the pin 51 will be driven.

The shaft 79 projecting from the housing 74 is provided with a hub 105 which journals the inner end of a shaft 106 which projects through a bearing 107 formed integral with the side frame 25, the outer end of the shaft 106 being provided with a knob 108. One end of the hub 105 is slotted as at 110 and is adapted to receive a pin 111 projecting from the shaft 106, the construction being such that when the pin 111 rests in the slot 110 the shaft 79 will drive the shaft 106. A spring 112 disposed around the shaft 106 has one of its ends abutting against the pin 111 and urges the pin 111 to the left (Fig. 6) to bring it into engagement with the slot 110. The other end of the spring 112 abuts against a gear 115 splined to the shaft 106. It will be noted that the outer end of the shaft 106 passes through a boss 117 provided with a slot 118 engageable by a pin 119 which projects through the shaft 106. The construction is such that the operator may grasp the knob 108 and pull the knob and the shaft 106 towards the right (Fig. 6) against the action of the spring 112 to disengage the pins 111 and 119 from the slots 110 and 118, respectively, whereupon the shaft 106 may be rotated through a small angle to bring the pin 119 out of registry with the slot 118. The pin 119 will then rest upon the outer end of the boss 117 and prevent the pin 111 from engaging the slot 110. When the apparatus is adjusted in this manner the shaft 79 can not drive the shaft 106. It may be mentioned at this point in the description that the shaft 106 may be disconnected from the shaft 79 whenever the spindle 18 between the shaft 56 and the pin 51 is driven and whenever the operator desires to operate the duplicating machine manually without the aid of the motor 70.

Referring now to Figs. 5, 8, and 18, it will be noted that the duplicating drum 50 comprises spaced discs 125 and 126 disposed inwardly of the side frames 25 and 26, respectively, the disc 126 being fixed to a stub shaft 127 and the disc 125 being fixed to the inner end of a stub shaft 128. The stub shafts 127 and 128 are journaled in the side frames 26 and 25, respectively. Extending between the discs 125 and 126 and secured thereto is an arcuate plate 130 which is hereinafter referred to as the platen plate 130 as it constitutes the platen of the improved duplicating machine. As illustrated in Fig. 8, a relatively wide opening is left in the cylindrical surface of the duplicating drum 50 as the platen plate 130 does not extend entirely around the drum. Adjacent one of the longitudinally extending edges of the platen plate 130 is a roller 132 of relatively small diameter. A rod 133 which has its ends journaled in the discs 125 and 126 is disposed adjacent the other longitudinally extending edge of the platen plate 130. The ends of the roller 132 are provided with trunnions 135 and 136 which are journaled in the discs 125 and 126, respectively, the trunnion 135 having a pinion 138 secured to its outer end. The pinion 138 meshes with an idler gear 139 which meshes with a gear 140. The gear 140 meshes with an idler gear 141 which meshes with a gear 142. The idler gears 139 and 141 are journaled on pins 144 and 145, respectively, projecting from the disc 125. The gear 140 is journaled on a pin 146 which is journaled in the disc 125. The gear 142 is mounted on a fabricated sleeve 147 which is journaled on the shaft 128 (Figs. 5 and 5A). Splined to a hub projecting from the gear 142 is a clutch collar 148 provided with clutch jaws 149 engageable with clutch jaws 150 formed on a hub 151 to which a gear 153 is secured. The hub 151 is mounted on a sleeve 154 which is journaled on the shaft 128.

It will be readily understood that when the clutch jaws 149 engage the clutch jaws 150 and the gear 153 is driven, the roller 132 will be driven through the gears 142, 141, 140, 139, and 138. The clutch jaws 149 and 150 are controlled by the lever 160 pivoted on a pin 161 mounted in a bracket 162 which is secured to the side frame 25 by rods 163. The bracket 162 is provided with a lug 164 which is secured to the plate 37 by a bolt 165 (Fig. 5). The upper end of the lever 160 is bifurcated and pins 166 extend from the bifurcations into a ring 168 which rides in an annular groove formed in the clutch collar 148. Obviously, the lever 160 may be oscillated to engage and disengage the clutch jaws 149 and 150.

The gear 140 has a relatively deep annular recess 170 in its inner side, which recess 170 accommodates a disc 171. The disc 171 is fixed to the pin 146. The gear 140 has an annular flange 172 overlying the outer cylindrical surface of the disc 171. A plurality of holes 175 drilled into the disc 171 accommodate springs 176 and steel balls 177, the springs yieldingly urging the balls 177 in radial directions with respect to the axis of rotation of the gear 140 (Fig. 20). The balls 177 are engageable with holes 180 drilled through the annular flange 172, the construction being such that when the balls 177 engage the holes 180 as illustrated in Fig. 20 and the gear 140 is driven, the disc 171 will be driven also until the force required to rotate the disc 171 becomes so large that the balls 177 are urged inwardly against the action of the springs 175 so that the flange 172 may ride freely over the disc 171 (Fig. 21).

The disc 171 is provided with an annular flange 182 to which a ratchet 183 is secured, the ratchet 183 being engageable by a pawl 184 pivoted upon a pin 185 projecting from the disc 125. A spring 186 yieldingly urges the pawl 184 into engagement with the ratchet 183, the spring 186 being disposed between the pawl 184 and a boss 187 projecting from the disc 125. The pawl 184 may be disengaged from the ratchet 183 by means comprising a bell crank lever 190 pivoted upon a pin 191 which projects from the disc 125. One arm of the lever 190 is engageable with the pawl 184 and the other arm of the lever 190 is pivoted to one end of a rod 192 which has its other end pivoted to one of a pair of brake actuating levers 195 and 196, the rod 192 being pivoted to the lever 196 in this instance. The lever 196 is fixed to a fabricated hub 199 journaled on a pin 200 which projects from the disc 125 (Fig. 22). The lever 195 is also journaled on the pin 200. One end of a brake band 201 is secured to the hub 199 by screws 202, the other end of the brake band 201 being secured to a lug 205 which projects from the disc 125. The brake band 201 is trained over a brake drum 206 keyed to a pin 207 rotatably journaled in the disc 125 (Figs. 5 and 20).

A pin 210 slidably journaled in the disc 126 is alined with the pin 146 journaled in the disc 125 (Fig. 5). The pin 210 is yieldably urged to the right (Fig. 5) by a spring 211 and the inner end of the pin is provided with a convex surface 212 for engagement with one of the concave depressions formed in the ends of each spindle 18. The shaft 146 is provided with a lug 213 engageable with one of the slots 58 provided in the ends of each spindle 18. As illustrated in Fig. 5, the pins 146 and 210 are adapted to hold and drive the spindle 18 disposed between them.

A pin 220 alined with the pin 207 is preferably identical in form with the pin 210 and is slidably journaled in the disc 126, the pin 220 being urged to the right (Fig. 5) by a spring 221. The pin 207 is provided with a lug 223 which has the same function as the lug 213 described above. Obviously, the pins 220 and 207 will hold a spindle 18 in the same manner as the pins 146 and 210. However, the lug 223 is not employed to drive the associated spindle 18. The latter spindle drives the lug 223 and the pin 207 when it is rotated. When the brake band 201 frictionally engages the brake drum 206 it prevents rotation of the spindle associated with the pin 207.

It will be readily understood that the spindles 18 shown in Figs. 5 and 8 are removable from the duplicating drum 50 and that other spindles 18 may be inserted therein with little effort. To guide the spindles 18 to the positions wherein they are engaged by the pins 146, 210, 207, and 220, flanges 230 and 231 project inwardly from the inner sides of the discs 125 and 126. The flanges 230 and 231 extend from the positions occupied by the spindles 18 in the duplicating drum to the peripheries of the discs 125 and 126, the inner ends of the flanges 230 and 231 being arcuate to fit snugly part way around the ends of the spindles 18 (Fig. 8). Co-operating with the flanges 230 and 231 are levers 233 and 234, respectively, which levers are pivoted on the discs 125 and 126 by pins 135. The levers 233 are provided with handles 237 whereby they may be displaced against the action of springs 238 which yieldably hold the levers 233 in positions wherein they co-operate with the arcuate ends of the flanges 230 to hold the associated spindle 18 in alinement with the pins 210 and 146. Springs 239 co-operate with the levers 235 to hold them in positions wherein they co-operate with the inner ends of the flanges 231 to hold the associated spindle 18 in alinement with the pins 220 and 207. It will be readily understood that when a spindle 18 is urged into its correct position between the flanges 230 and the levers 233, the springs 238 will yield. If the lug 213 on the pin 146 is not in alinement with the corresponding slot 58 in the associated spindle 18, the flanges 230 and the levers 233 will retain the spindle 18 in alinement with the pins 210 and 146 until the operator rotates the spindle into a position wherein its slot will be alined with the lug 213. The flanges 231 and the levers 235 co-operate in a similar manner.

In Figs. 5 and 18 one of the hectograph bands 17 is shown trained over the platen plate 130. One end of the hectograph band 17 is secured detachably to the spindle 18 disposed between the pins 210 and 146, the other end of the band 117 being secured detachably to the spindle 18 disposed between the pins 207 and 220. When the band 17 is advanced over the platen plate 130 as hereinafter explained, the band is unwound from the spindle 18 associated with the pins 207 and 220 and after it passes over the platen it is wound upon the spindle 18 associated with the pins 146 and 210. After a section of the band 117 has been advanced over the platen plate 130 and it becomes necessary to stretch the band upon the platen plate for printing, the brake band 201 is brought into effective engagement with the brake drum 206 to hold the spindle 18 associated with the pin 207 against rotation. The gear 140 associated with the pin 146 is driven until the gelatin band is drawn so taut that it holds the disc 171 against rotation, whereupon the flange 172 on the gear 140 rides over the balls 177 as described above. The pawl 184 which engages the ratchet 183 prevents the band from being unwound from the spindle 18 associated with the pin 146 after the band has been drawn taut. As hereinafter explained, the lever 190 disengages the pawl 184 from the ratchet 183 while the band 17 is being advanced over the platen plate 130, but the pawl 184 is permitted to engage the ratchet 183 as soon as the brake band 201 engages the brake drum 206 at the start of the stretching operation.

The mechanism whereby the operator controls the advancing of the band over the platen plate 130 and whereby the operator controls the operation of stretching the band taut over the platen plate will now be described. This mechanism includes the actuating levers 195 and 196 (Figs. 3, 13, 14, 18, 19, 20, and 22). The levers 195 and 196 are urged yieldingly in a clockwise direction by springs 250 and 251, respectively, each of which springs has one of its ends secured to one of a pair of pins 253 projecting from the disc 125. The spring 251 has its other end secured directly to one arm of the lever 196 (Fig. 20). The spring 250 has its other end secured to an angle iron 255 which is secured to an arm of the lever 195.

A pin 256 projects from the lever 196 and is engageable by an arm 257 of a bell crank lever 258 which also comprises an arm 259. A lever 260 is provided with a pin 261 which is engageable with the lever 195. The levers 258 and 260 are pivoted on a stub shaft 263 projecting from the inner side of the side frame 25 (Fig. 14). A lever 265 also pivoted on the shaft 263 is secured to a hub 266, the hub 266 being secured also to the lever 260. The free end of the lever 265 is pivoted to one end of a link 268 which has its other end pivoted to a lever 270. The lever 270 is pivoted on a pin 271 mounted in a U-shaped bracket 273 which is secured to the side frame 25 by bolts 275. A pin 276 which projects from the lever 270 rides in a slot 277 formed in an arm 278 of a bell crank lever 279, the other arm of the bell crank lever 279 being designated by the reference numeral 280. A spring 281 yieldingly urges the bell crank lever 279 in a counter-clockwise direction (Fig. 13). The arm 280 is provided with a pin 283 which rides in a slot 284 formed in the lower end of a link 285 which has its upper end pivoted by a pin 286 to a block 288 provided with trunnions 289. Each of a pair of links 290 has one of its ends pivoted on a trunnion 289, the other ends of the links 290 being pivoted on trunnions 291 projecting from a block 293 secured to the inner side of the side frame 25. Each of a pair of links 294 has one of its ends pivoted on one of the trunnions 289, the other ends of the links 294 being pivoted on trunnions 295 projecting from the lower end of the lever 160 (Figs. 5 and 5B and 13).

A pin 300 projecting from the arm 280 of the bell crank lever 279 is pivoted to one end of a link 301 which has its other end pivoted by a pin 302 to a lever 303. The lever 303 has a hub 304 which is pinned to a sleeve 305 rotatably journaled on a shaft 306 (Figs. 15 and 16). Keyed to the sleeve 305 is a hub 308 forming part of a foot treadle 309.

As best shown in Fig. 27, the foot treadle 309 has an auxiliary foot treadle 310 pivoted to it by a pin 311, the auxiliary foot treadle 310 being provided with an upwardly extending arm 312 engageable with a pin 314 which projects from a pawl 315 which is pivoted on the pin 311. A spring 317 yieldingly urges the auxiliary foot treadle 310 in a clockwise direction (Fig. 27) around the pin 311. A spring 318 extending between the pin 314 and a pin 319 which projects from the foot treadle 309, yieldingly urges the pawl 315 in a clockwise direction (Fig. 17) to hold it in engagement with a dog 320 formed integral with a sleeve 322 rotatably journaled on the sleeve 305. It will be noted that the pin 314 carried by the pawl 315 is movable in a slot 325 formed in the foot treadle 309 (Fig. 28). Formed integral with the sleeve 322 is a lever 327 which has its free end pivoted to a link 328 which has its upper end pivoted by a pin 330 to the arm 259 of the bell crank lever 258.

Figs. 15 and 27 illustrate the manner in which the auxiliary foot treadle 310 projects through a slot 340 in the foot treadle 309. Bosses 341 formed on the foot treadle 310 ride on the side walls of the slot 340 to hold the foot treadle in alinement with the foot treadle 309. During the operation of the improved machine, the operator may place his foot on the foot treadles 309 and 310 in such manner that the ball of the foot rests upon the foot treadle 309 and the toe rests upon the auxiliary foot treadle 310. If the foot treadle 310 is displaced relative to the foot treadle 309 in a counter-clockwise direction (Figs. 17 and 27) around the pin 311, the arm 312 displaces the pin 314 and the pawl 315 in a counter-clockwise direction (Figs. 17 and 27) around the pin 311 against the action of the spring 318. Such displacement of the foot treadle 310 relative to the foot treadle 309 causes disengagement of the pawl 315 from the dog 320 whereupon the dog 320 and the sleeve 322 will rotate through a small angle from the dotted line position in which it is in Fig. 17 to the full line position in which it is shown in the same figure. This angular movement of the dog 320 and the sleeve 322 is caused by a spring 345 which has one end attached to a pin 346 projecting from the side frame 25. The other end of the spring 345 is attached to the arm 257 of the bell crank lever 258. When the operator releases the pressure of his toe upon the foot treadle 310, the foot treadle is returned to its original position relative to the foot treadle 309 by the spring 317.

The spring 345 will not displace the dog 320 and the sleeve 322 in the manner described above unless the foot treadle 309 is first depressed to tension the spring. If the foot treadle 309 is in its uppermost position, the foot treadle 310 may be depressed without actuating any of the mechanism of the improved machine.

Assuming that the foot treadles 309 and 310 are in the positions in which they are illustrated in Fig. 10 and that one wishes to advance the gelatin band over the platen plate 130, one may depress the foot treadle 309 to the position wherein it is illustrated in Fig. 13. When the foot treadle 309 is depressed in this manner, the foot treadle 310 is displaced angularly through the same distance through the action of the pawl 315 and the dog 320. Such displacement of the foot treadles 309 and 310 from the positions wherein they are shown in Fig. 10 to the positions wherein they are shown in Fig. 13 causes the links 301 and 328 to be pulled downwardly to the positions wherein they are shown in Fig. 13. The link 301 displaces the bell crank lever 279 in a clockwise direction (Fig. 13) against the action of the spring 281 and the pin 276 causes angular displacement of the lever 270 to the position wherein it is shown in Fig. 13. It will be noted that there is lost motion between the bell crank lever 279 and the lever 270 during the initial movement of these levers from their positions in Fig. 10 to their positions in Fig. 13. The purpose of this construction will presently appear. The angular displacement of the lever 270 to the position wherein it is shown in Fig. 13 causes the lever 268 to displace the arm 265 angularly in a clockwise direction (Fig. 13) around the stub shaft 263, the lever 260 being displaced through the same angle. During the angular displacement of the lever 260, the pin 261 angularly displaces the actuating lever 195 in a counter-clockwise direction (Fig. 13) against the action of the spring 250. This displacement of the actuating lever 195 causes the angle iron 255 to move away from a pin 350 which projects from the actuating lever 196 into the path of the angle iron. It will be readily understood that when the angle iron 255 is urged against the pin 350 by the spring 250 as illustrated in Fig. 3, the force of the spring 250 is applied to the lever 195 through the angle iron 255 and the pin 350 so that the spring 250 assists the spring 251 to draw the brake band 201 into effective engagement with the brake drum 206 so that the lowermost spindle 18 shown in Figs. 5 and 8 will be held against rotation.

Of course, it is understood from the foregoing description that when the actuating lever 195 is displaced angularly in a counter-clockwise direction (Fig. 13) so that the angle iron 255 moves downwardly, the spring 250 no longer aids the spring 251 to draw the brake band 201 around the brake band 206.

The downward displacement of the link 328 when the foot treadle 309 is displaced, as described above, causes the link 328 to displace the bell crank lever 258 in a clockwise direction from the position wherein it is shown in Fig. 10 to the position wherein it is shown in Figs. 13 and 18. Such displacement of the lever 258 causes its arm 257 to displace the pin 256 and the actuating lever 196 in a counter-clockwise direction (Figs. 10, 13, and 18) against the action of the spring 251. Such displacement of the lever 196 releases the brake band 201. The lowermost spindle 18 shown in Figs. 5 and 8 is then free to turn.

The downward displacement of the link 301 when the foot treadle 309 is displaced from the position wherein it is shown in Fig. 10 to the position wherein it is shown in Fig. 13 causes the arm 280 to draw the link 285 downwardly from the position wherein it is shown in Fig. 10 to the position wherein it is shown in Fig. 13, although there is lost motion between the arm 280 and the link 285 during the initial movement of the arm 280. This downward movement of the link 285 causes it to draw the block 288 downwardly and the toggle arrangement of the links 290 and 294 enables them to displace the lever 160 in a clockwise direction (Fig. 5) to bring the clutch jaws 149 into engagement with the clutch jaws 150. Because of the lost motion connection between the arm 280 and the link 285, the engagement of the clutch jaws 149 with the clutch jaws 150 takes place during the final movement of the foot treadle 309 into the position wherein it is shown in Fig. 13.

When the clutch jaws 149 engage the clutch jaws 150, the clutch collar 148 drives the gear 142 and it, in turn, drives the gears 141, 140, 139, and 138 so that the roller 132 and the uppermost spindle 18 shown in Figs. 5 and 8 are driven, the uppermost spindle 18 being driven through the pin 146.

As explained above, the clutch jaws 150 are driven by the gear 153 which meshes with an idler gear 360 (Fig. 10). The idler gear 360 is mounted on a stub shaft 361 projecting from the inner side of the side frame 25. The gear 360 meshes with the gear 115.

When the gears 142, 141, 140, 139, and 138 are driven in the manner described above through the medium of the clutch jaws 149 and 150, the uppermost spindle 18 shown in Figs. 5 and 8 is rotated in a counter-clockwise direction (Figs. 8, 18, and 19) so that it pulls the gelatin band from the lowermost spindle 18 shown in Fig. 8 and advances the band over the platen plate 130. When the gelatin band has been advanced as much as desired, the operator holds the foot treadle 309 in its depressed position and forces the foot treadle 310 downwardly against the action of the spring 317 so that the arm 312 displaces the pin 314 and the pawl 315 in a counter-clockwise direction (Figs. 17 and 27) around the pin 311 whereupon the pawl 315 releases the dog 320 and the spring 345 acts as described above to displace the sleeve 322 and the lever 327 in a clockwise direction (Fig. 13) to lift the link 328 which displaces the bell crank lever 258 in a counter-clockwise direction (Fig. 13) into the position wherein it is shown in Fig. 19. This displacement of the lever 258 withdraws its arm 257 from engagement with the pin 256 projecting from the actuating lever 196. The spring 251 then displaces the actuating lever 196 in a clockwise direction (Fig. 19) so that the brake band 201 frictionally engages the brake drum 206 and tends to prevent rotation of the lowermost spindle 18 shown in Figs. 5, 8, and 20. It will be noted that the actuating lever 195 is still retained in a position wherein it prevents its spring 250 from co-operating with the spring 251 to draw the brake band 201 taut on the brake drum 206.

As soon as the rotation of the lowermost spindle 18 shown in Figs. 5, 8, and 20 is retarded by the brake band 201 through the action of the spring 251, the continued rotation of the uppermost spindle causes it to draw the gelatin band taut over the platen plate 130. When the gelatin band is sufficiently taut, the balls 177 are forced downwardly in the holes 175 against the action of the springs 176 so that the gear 140 does not drive the disc 171, whereupon the uppermost spindle 18 shown in Figs. 5, 8, and 20 ceases to rotate. When the actuating lever 196 was displaced to bring the brake band 201 into effective engagement with the brake band 206, the rod 192 displaced the bell crank lever 190 thus permitting the pawl 184 to engage the ratchet 183. When the uppermost spindle 18 ceases to rotate because the balls 177 have been pushed down into the holes 175, the pawl 184 and the ratchet 183 co-operate to prevent the uppermost spindle in Fig. 20 from rotating in a clockwise direction (Fig. 20). This prevents the gelatin band from unwinding from that spindle.

After the gelatin band has been drawn taut in the manner described above, the operator releases the foot treadle 309, whereupon it is drawn upwardly through the action of the spring 281 which acts through the lever 303, the link 301 and the bell crank lever 279, the lever 303 being pinned to the sleeve 305 which is keyed to the foot treadle 309. As a result of this upward movement of the foot treadle 309, the pawl 315 re-engages the dog 320.

The upward movement of the link 301 causes the pin 283 to move upwardly in the slot 284, whereupon a spring 370 pulls the link 285 and the block 288 upwardly. It will be noted that one end of the spring 370 is secured to the block 288, the other end of the spring being secured to a pin 371 which projects from the inner side of the side frame 25. During the initial upward movement of the link 285, the clutch jaws 149 are disengaged from the clutch jaws 150 through the action of the toggle-like links 290 and 294 and the lever 160. During this initial upward movement of the link 285, the pin 276 and the lever 270 remain stationary because of the lost motion connection, provided by the pin 276 and the slot 277, between the bell crank lever 279 and the lever 270. The continued upward movement of the link 301 causes the bell crank lever 279 to displace the lever 270 into the position wherein it is shown in Fig. 10 so that the pin 261 is withdrawn from engagement with the actuating lever 195. The actuating lever 195 then rotates in a clockwise direction (Figs. 10 and 13) through the action of the spring 250 which engages the angle iron 255 with the pin 350. The springs 250 and 251 then both act upon the brake band 201 and hold the lowermost spindle in Figs. 5, 8, and 20 against rotation. It will be noted that during the stretching operation only the spring 251 acts upon the brake band. The tension of the spring 251 is such that it permits a slight slipping of the brake drum relative to the brake band during stretching operation so that the gelatin band will not be torn. Of course, the spring 251 may have any tension desired, but in practice it has been found advisable to permit some slip between the brake drum and the brake band when the gelatin band is being stretched taut over the platen plate 130. When both springs 250 and 251 are acting upon the brake band 201, the brake drum 206 is held against any movement relative to the brake band. The overrunning clutch provided by the gear 140, the disc 171 and the balls 180 is found to be particularly advantageous when most of the gelatin band has been wound around the uppermost spindle shown in Figs. 5, 8, and 20.

The means for driving and controlling the duplicating drum 50 during the duplicating operations will now be described. This means preferably comprises a ratchet disc 380 rotatably journaled on the hub 151 which carries the gear 153 (Figs. 5, 5A, 35, and 36). The teeth of the ratchet disc 380 are shown at 381 and are engageable by a pawl 382 pivoted on a pin 383. The ratchet disc 380 is provided with three round holes 384 and with a slot 385 which opens into one of the holes 384. A spring 386 disposed in the slot 385 has one of its ends secured to a pin 387 projecting from the ratchet disc 380, the other end of the spring 386 being secured to a pin 388 which projects from the gear 153. The outer end of the pin 388 is provided with a nut 390 of relatively large diameter (Fig. 5). Pins 392 project through two of the holes 384 and one of the pins 392 is provided with a rubber sleeve 393 engageable with the sides of the associated hole 384. The rubber sleeve 393 serves as a bumper.

The pin 383 projects from a gear 395 secured to a hub 396 which is keyed to the shaft 128. It will be recalled that the gear 153 rotates continuously when the motor 79 is in operation. The gear 153 drives the ratchet disc 380 continuously through the pins 387 and 388 and the spring 386, the spring 386 being of such size that unless the pawl 382 is engaging the teeth 381 and driving the drum 50, the spring will not be lengthened appreciably when the ratchet disc 380 is being driven by the gear 153. As hereinafter explained, engagement of the teeth 381 by the pawl 382 causes the pawl to drive the gear 395 which, in turn, drives the duplicating drum 50. When the spring 386 is subjected to the load of the duplicating drum, it elongates so that the rubber bumper sleeve 393 advances from the position wherein it is shown in Fig. 35 to a position intermediate the positions wherein it is shown in Fig. 35 and Fig. 36. Obviously, the spring 386 and the rubber sleeve 393 absorb the shock when the pawl 382 throws the load of the duplicating drum on the ratchet disc 380. In practice, it has been found to be advantageous to have the spring 383 of such size that it drives the ratchet disc at all times, the sleeve 393 being simply provided to absorb the return shock after the starting inertia has been absorbed. It may be mentioned at this point that as the gear 395 and the disc 125 are both keyed to the shaft 128, the duplicating drum 50 will rotate with the gear 395.

The pawl 382 is controlled by means comprising a foot treadle 400 pinned to the shaft 306 (Figs. 15 and 16). A lever 401 pinned to the shaft 306 is connected by a link 402 to bifurcations 404 formed integral with a block 405 (Figs. 10 and 25). A pin 406 passes through the upper end of the link 402 and through the bifurcations 404, the ends of the pin being mounted in bifurcations 407 projecting from the free end of a lever 408. The lever 408 is journaled on a stub shaft 410 projecting from the side frame 25. The lever 408 is yieldably urged in a clockwise direction around the shaft 410 by a spring 411, one end of the spring 411 being secured to the lever 408 and the other end of the spring being secured to the angle iron 30. Displacement of the lever 408 in a clockwise direction (Fig. 26) is limited by a lug 414 which projects from the inner side of the side frame 25.

It will be noted that the pawl 382 is engageable by the block 405 and it will be readily understood that when the block 405 is in the position wherein it is shown in Fig. 26, continued rotation of the gear 153 and the ratchet disc 380 will cause the pawl 382 to displace the block 405 in a clockwise direction (Fig. 26) around the pin 383 until it strikes against a rubber bumper 418 carried by the lever 408. Such displacement of the block 405 by the pawl 382 causes the block 405 to withdraw the pawl 382 from engagement with the ratchet disc 380 (Figs. 10 and 23).

Referring to Fig. 26, it will be noted that a spring 420 yieldably urges the block 405 in a counter-clockwise direction. When the block 405 is not engaged by the pawl 382, the block rests against a rubber bumper 421 secured to a plate 422 which is fixed to the ends of the bifurcations 407.

Figure 23:
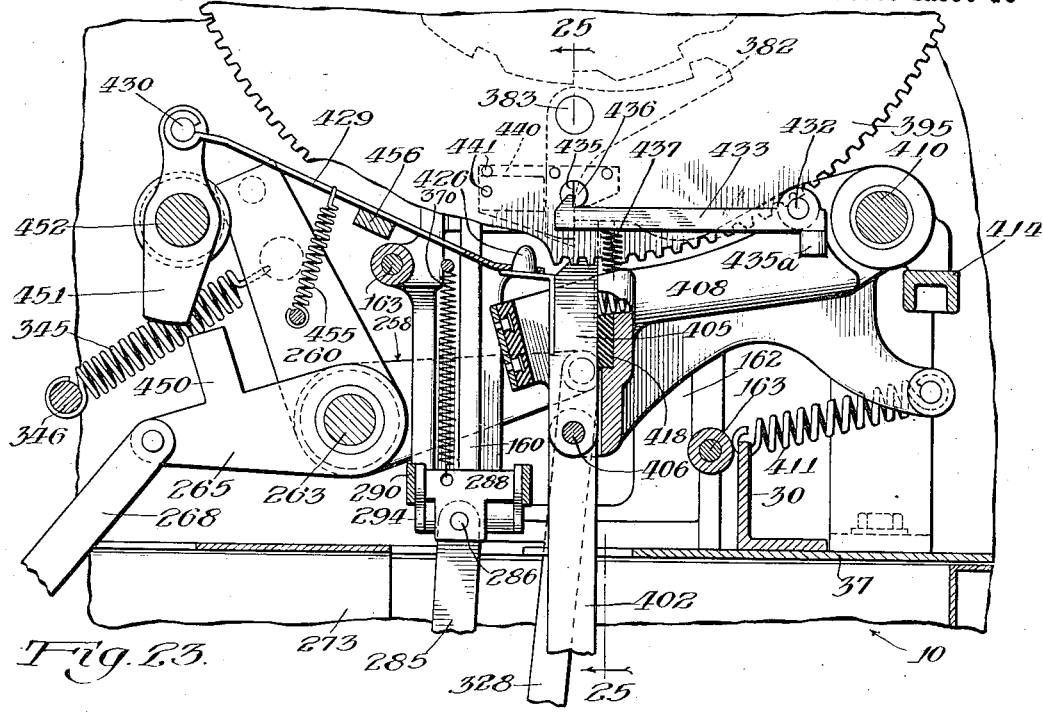
Fig. 23 is a section taken on line 23—23 of Fig. 15.
Figure 24:
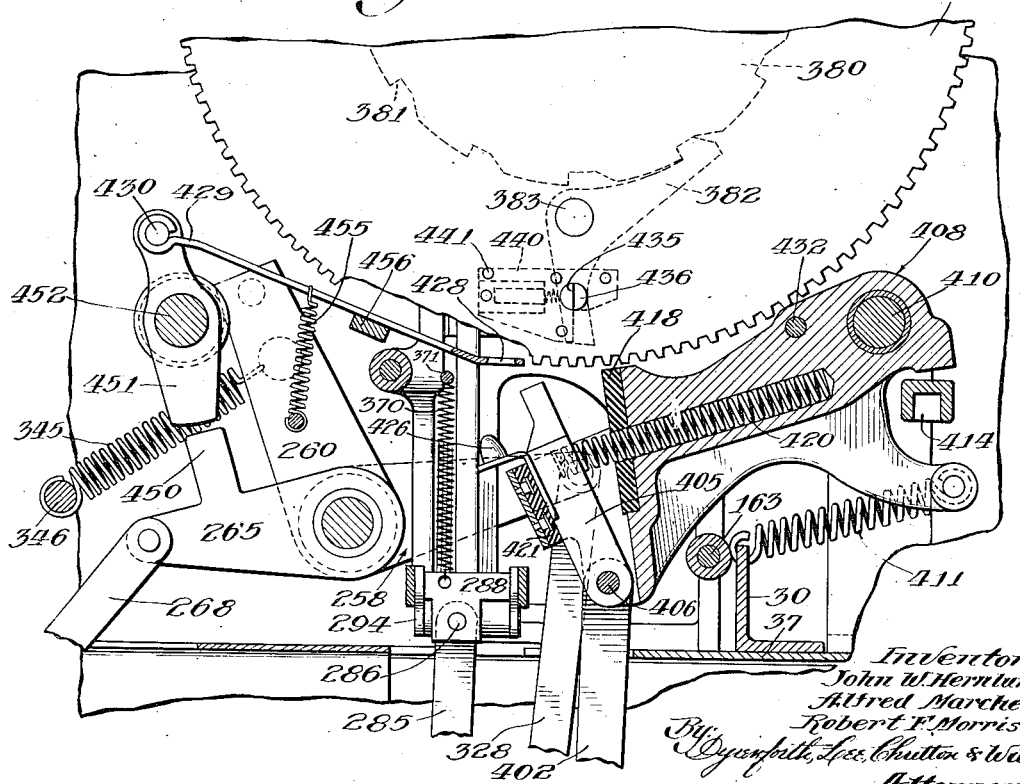
Fig. 24 is a section taken on substantially the same line as Fig. 23 but showing certain mechanism in a changed position.

A bracket 425 secured to the block 405 is provided with a tapered pin 426 adapted to enter a hole 428 provided in the free end of a bar 429 which is pivoted on a pin 430 (Figs. 23 and 24).

A pin 432 projecting from the lever 408 pivots a pawl 433 which is engageable with a stop surface 435 provided upon a pin 436 (Figs. 11 and 23). Displacement of the pawl 433 in a clockwise direction (Fig. 23) around the pin 432 is limited by a lug 435a projecting from the lever 408. A spring 437 yieldably urges the pawl 433 in a clockwise direction (Fig. 23). The spring 437 is disposed between the pawl 433 and the lever 408.

The pin 436 projects from the gear 395 to which gear the pawl 382 is secured. Obviously, when the pawl 433 engages the stop surface 435, the gear 395 and the duplicating drum 50 are held against rotation in a clockwise direction (Fig. 23).

Referring to Figs. 10, 11, and 25, it will be noted that a block 440 is associated with the pawl 382. The block 440 is secured to the inner side of the gear 395 by screws 441 and houses a spring 443 which is compressed by the pawl 382 when the pawl is disengaged from the ratchet disc 380. Thus, it will be understood from Figs. 10 and 26 that if the pawl 382 is in engagement with the ratchet disc 380 so that the gear 395 is being driven in a counter-clockwise direction (Figs. 10 and 26) and if the lever 408 is in its uppermost position as illustrated in Figs. 10 and 26, the pawl 382 will strike the block 405 as illustrated in Fig. 26 and displace the block 405 angularly to drive it against the rubber bumper 418. During this displacement of the block 405, the pawl 382 will be disengaged from the ratchet disc 380 and will come to rest in the position wherein it is illustrated in Fig. 10. Of course, the gear 395 also stops rotating. At this point, the spring 443 is nearly fully compressed and as the pawl 433 is engaging the stop surface 435, the gear 395 cannot rotate in a counter-clockwise direction until the block 405 has been displaced downwardly to bring it out of the path of the pawl 382. It will be readily understood, therefore, that if the foot treadle 400 is depressed to pull the lever 408 and the block 405 downwardly, the block 405 will release the pawl 382 so that the spring 443 will displace the pawl 382 angularly into engagement with the ratchet disc 380, whereupon the gear 395 will be driven and will, in turn, drive the duplicating drum 50 (Fig. 24). As long as the foot treadle 400 is held in its depressed position, the gear 395 will continue to rotate and will rotate the duplicating drum. However, if the foot treadle 400 is released, it will be retracted to its uppermost position by the action of the spring 411 and the block 405 will return to its position in the path of the pawl 382. Then when the pawl 382 strikes the block 405, the rotation of the gear 395 and the drum 50 will cease and they will be locked in the positions wherein they are illustrated in Figs. 5, 8, and 20. The gelatin band may be advanced then if it is so desired or the foot treadle 400 may be depressed to resume the duplicating operations.

Referring to Figs. 23 and 24, it will be noted that the lever 265 is provided with an upwardly extending lug 450 which is alined with a stop lever 451 pivoted on a stub shaft 452. The stub shaft 452 projects from the inner side of the side frame 25. The stop lever 451 carries the pin 430 described above. The spring 455 holds the bar 429 against a lug 456 which projects from the inner side of the side frame 25.

When the block 405 is in its uppermost position as illustrated in Fig. 23 so that the duplicating drum is held against rotation, the tapered pin 426 projects through the hole 428 and holds the bar 429 in the position illustrated in Fig. 23 so that the stop lever 451 will not interfere with the movements of the lug 450 and the lever 265. However, when the foot treadle 400 is depressed to the position wherein it is shown in Fig. 24, the block 405 will swing to the left (Figs. 23 and 24) through the action of the spring 420 and the pin 426 will urge the bar 429 into the position wherein it is shown in Fig. 24. This displacement of the bar 429 takes place before the pin 426 is withdrawn from the hole 428 and the bar then holds the stop lever 451 in the path of the lug 450. As explained above, when the block 405 is in its lowermost position, the duplicating drum is being rotated and it is obvious that the apparatus would be injured if the operator were able to depress the foot treadle 309. Any attempt of the operator to depress the foot treadle at this time will be prevented by the lug 450 which will strike the stop lever 451 during the initial downward movement of the foot treadle 309.

As best shown in Figs. 4, 15, 18, and 19, the stub shaft or pin 452 carries rubber sleeves 460 against which the levers 258 and 260 strike when they are retracted to the positions wherein they are shown in Fig. 10. In Figs. 10 and 13, a rubber sleeve 463 is shown on a pin 464 mounted in the bracket 273. The arm 278 of the bell crank lever 280 strikes the rubber sleeve 463 when the lever is retracted to the position wherein it is shown in Fig. 10.

The mechanism for feeding master sheets and copy sheets to the duplicating drum will now be described. This mechanism comprises a platen roller 500 which is preferably formed from sponge rubber and is mounted on a sleeve 501, the sleeve 501 being rotatably journaled on a shaft 502 (Figs. 29 to 34, inclusive). As best illustrated in Fig. 33, the ends of the shaft 502 are pinned in the ends of stub shafts 503, the stub shafts 503 being provided with collars 504 at their outer ends. The collars 504 are pinned to the shafts 503 and are journaled in bearing plates 506. The longitudinal axis of the shaft 502 is eccentric with respect to the axes of rotation of the shafts 503. Springs 507 disposed around the collars 504 yieldingly urge the shafts 503 in a counter-clockwise direction (Figs. 29 and 32, inclusive, and Fig. 34). One end of each spring 507 abuts against one of a pair of pins 508 which project from the outer sides of the bearing plates 506. The other ends of the springs 507 abut against lugs 510 projecting from levers 511 pinned to the collars 504. When the platen roller 500 is in its printing or duplicating position, the lugs 510 abut against rubber bumpers 513 mounted in lugs 514 on one of the plates 506. Plates 514a secured to the lugs 514 by screws 515 hold the rubber bumpers in place. Stop members 516 are secured to the lugs 514. The function of the stop members 516 will be described below.

Keyed to each shaft 503 intermediate its ends is a collar 520. A lever 521 is pinned to one of the collars 520 and has a roller 521a engageable by a cam 522, the cam 522 being secured to the disc 126 by bolts 523, 524, and 525.

Extending between the bearing plates 506 and secured thereto by screws 528 is a sheet metal cover plate 529 which co-operates with the bearing plates 506 to provide a frame for the platen roller 500 and for other mechanism hereinafter described. The carriage for the platen roller is designated in general by the reference character 530, the carriage 530 being pivoted to the side frames 25 and 26 by pins 532 projecting from the inner sides of the side frames 25 and 26. The inner ends of the pins 532 journal the bearing plates 506. The platen roller carriage 530 is normally held in the position wherein it is shown in the drawings by means comprising pins 534 slidably and rotatably journaled in bosses 535 projecting from the inner sides of the side frames 25 and 26. The inner ends of the pins 534 are of enlarged diameter to provide shoulders 536 on the pins. These enlarged ends normally project through holes 537 provided in the bearing plates 506. Obviously, when the pins 534 project through the holes 537, the platen roller carriage 530 is held against displacement around the pins 532. Disposed around each pin 534 and interposed between its shoulder 536 and the associated side frame is a spring 540 which yieldably urges the pin 534 toward the associated bearing plate 506. A knob 541 is pinned to the outer end of each pin 534 and is provided with pins 542 adapted to slide into holes 543 formed in the associated side frame 25 or 26 as illustrated in Fig. 30. It will be readily understood that the operator may retract the pins 534 by pulling on the knobs 541 and that after the pins 542 have been withdrawn from the holes 543, the knobs 541 may be rotated through a small angle to bring the pins 542 out of registry with the holes 543, whereupon the operator may release the knobs 541 and the pins 534 will be held in positions wherein they do not engage the holes 537. The carriage 530 may then be displaced angularly in a counter-clockwise direction (Fig. 29) until the stop members 516 strike against the inner surfaces of flanges 545 provided upon the side frames 25 and 26. This construction permits the operator to inspect and clean the mechanism carried by the carriage 530 and facilitates the loading of gelatin rolls.

Figure 31:
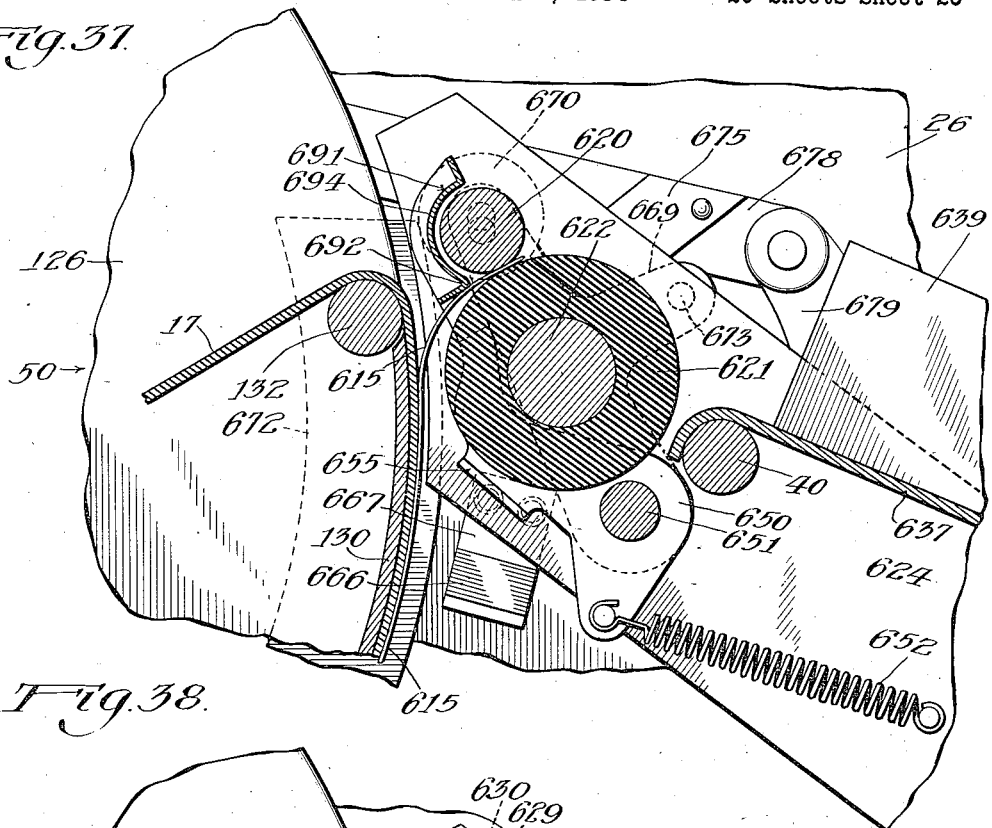
Fig. 31 is a section taken on the same line as Fig. 29 but showing certain mechanism in a changed position.

A shaft 550 extends between the bearing plates 506 and is rotatably journaled in them. A margin bar 551 is secured to the free ends of two levers 552 which are provided with hubs 554 pinned to the shaft 550. A spring 555 disposed around the shaft 550 has one of its ends secured to one of the levers 552 and has its other end abutting against a pin 557 carried by a U-shaped bracket 558 which is mounted on the cover plate 529. The spring 555 yieldably urges the levers 552 and the margin bar 551 in a counter-clockwise direction (Figs. 29 and 31). A lever 560 pinned to the shaft 550 carries a roller 561 which is engageable by a cam 562. The cam 562 is secured to the disc 126 by bolts 563. It will be noted that the cam 562 is arcuate in form and that as it rotates, it will engage the roller 561 once during each revolution of the duplicating drum 500 and displace the roller and the shaft 550 in a clockwise direction (Fig. 32) against the action of the spring 555. This displacement of the shaft 550 carries the margin bar 551 from the position wherein it is shown in Fig. 31 to the position wherein it is shown in Fig. 32. When the roller 561 rolls off the cam 562, the spring 555 retracts the margin bar 551 to the position wherein it is shown in Fig. 31.

Plates 565 keyed to the shaft 550 have lugs 566 engageable with rubber bumpers 567 carried by the plates 506. The lugs 566 co-operate with the rubber bumpers 567 to limit movement of the margin bar 551 in a counter-clockwise direction (Fig. 29) through the action of the spring 555.

Pins 568 pivot the ends of links 569 to the plates 565. The other ends of the links 569 are slotted as at 570. Pins 571 ride in the slots 570. The pins 571 project from relatively short levers 573 which are pivoted on the bearing plates 506 by pins 574. Extending between the levers 573 and secured thereto is an angle plate 575 to which a plurality of paper stop fingers 576 are secured. It will be noted that the cover plate 529 is provided with a plurality of slots 578 through which the fingers 576 may pass. The construction is such that each time the margin bar 551 is displaced from the position wherein it is shown in Fig. 31 to the position wherein it is shown in Fig. 32, the fingers 576 will be displaced from the position wherein they are shown in Fig. 31 to the position wherein they are shown in Fig. 32. Obviously, this movement of the fingers results from the co-operation of the spring 555 and the cam 562.

As best illustrated in Figs. 3 and 9, levers 580 are pivoted to the side frames 25 and 26 by pins 581. The pivoted ends of the levers 580 have lugs 582 which co-operate with pins 583 to limit displacement of the levers 580 in a counter-clockwise direction (Fig. 9). When the levers 580 are displaced in a counter-clockwise direction from the positions wherein they are shown in Fig. 9 they may be brought into positions wherein they extend upwardly from the machine and hold a paper guide plate 585 above the machine so that the operater may have access to the mechanism disposed below the plate when the plate is in its normal position as illustrated in Fig. 32. Displacement of the levers 580 in a clockwise direction (Fig. 9) is limited by pins 587 projecting from the inner sides of the side frames 25 and 26. The paper guide plate 585 is secured to a plate 588 having downwardly extending flanges 589 which are secured to the free ends of the levers 580. The guide plate 585 is provided with upwardly extending flanges 590. A shaft 592 extends between the free ends of the levers 580 and is secured thereto. Pivoted on the shaft 592 is a plate 593 provided with slots 594 which are alined with the fingers 576. The plate 593 is engaged by an arm 595 extending from a sleeve 596 mounted on one of the pins 587. The arm 595 forms part of a counter (not shown) which indicates the number of copies duplicated by the machine. The arm 595 is yieldingly urged against the plate 593 by a spring (not shown). It will be noted that the plate 593 forms an extension of the lower end of the guide plate 585.

As best shown in Figs. 9 and 29, a latch member 600 is pivoted to one of the plates 506 by a pin 601. The latch member 600 normally gravitates into the position wherein it is shown in Figs. 9 and 29, the latch member 600 being provided with a tail 602 which normally abuts against a lug 605 projecting from one of the plates 506 (Fig. 30). The latch member 600 lies in the path of the bolt 523 which secures the cam 522 to the disc 126. The shank of the bolt extends beyond the cam 522 a sufficient distance for this purpose. As is evident from an inspection of Fig. 9, the bolt 523 will repeatedly strike the latch member 600 when the duplicating drum is rotated, but the bolt 523 will simply displace the latch member 600 angularly in a counter-clockwise direction (Fig. 9) around the pin 601 and then pass beyond it. However, if an attempt is made to rotate the drum in a counter-clockwise direction (Fig. 9), the bolt 523 will strike the end of the latch member 600 and prevent continued rotation of the drum. This construction prevents the operator from reversing the direction of rotation of the drum and thus insures that the margin bar 551 and other apparatus carried by the carriage 530 will not be injured through an attempt to rotate the drum backwards through too great an angle.

Figure 7:
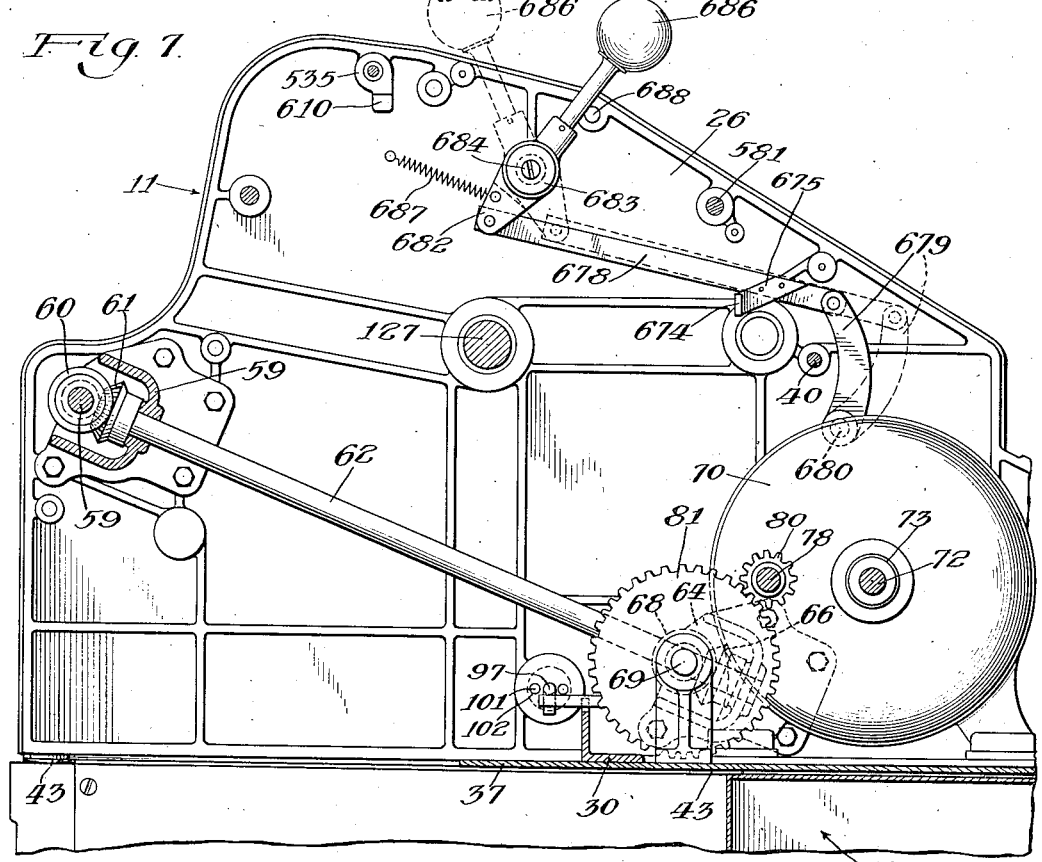
Fig. 7 is a section taken on line 7—7 of Fig. 6.

Referring to Figs. 7 and 31, it will be noted that the bosses 535 on the frames 25 and 26 are provided with lugs 610 which are engageable by lugs 611 formed on the bearing plates 506. The lugs 610 and 611 co-operate to limit displacement of the carriage 530 in a clockwise direction (Fig. 31) around the pins 532.

The operation of the sheet feeding apparatus is substantially as follows: If it is assumed that the sheet feeding apparatus is in the condition in which it is illustrated in Fig. 29, it is obvious that a sheet of paper 615 may be fed manually down the guide plate 585 until it gravitates into the angle of the margin bar 551. This feeding is done while the machine is in operation. At this time, the platen roller 500 is in its retracted position as the roller 521a is riding on the cam 522. However, as the duplicating drum 50 is rotating in a counterclockwise direction (Fig. 29) the cam 522 will leave the roller 521a in sufficient time to permit the springs 507 to bring the platen roller 500 into the position wherein it is shown in Fig. 31 when the forward end of the duplicating surface of the gelatin band is advanced to the position wherein it is shown in Fig. 31. Obviously, the platen roller 500 and the gelatin band will then co-operate with each other to advance the paper so that it will be applied to the tacky surface of the band. It will be noted that when the platen roller and the forward end of the duplicating band occupy the positions wherein they are shown in Fig. 31, the margin bar 551 still lies in the path of the paper and the forward end of the duplicating band. However, before the paper is advanced any appreciable distance, the roller 561 rolls up on the cam 562 and the margin bar 551 is retracted to the position wherein it is shown in Fig. 32, this displacement of the margin bar 551 being against the action of the spring 555.

When the margin bar 551 is retracted to the position wherein it is shown in Fig. 32, the fingers 576 are advanced through the slots 578 and contact with the paper 615 with sufficient force to angularly displace the plate 593 a slight distance around the shaft 592. This movement of the plate 593 causes a slight movement of the arm 595 which actuates the counter (not shown). If the machine is in operation and no paper is being advanced over the guide plate 585 when the fingers 576 are displaced into the positions in which they are shown in Fig. 32, the fingers will pass through the slots 594 and will not cause the plate 593 to actuate the arm 595. Obviously, the counting device (not shown) will be actuated only when a sheet is being duplicated.

Another function of the fingers 576 is to serve as paper stops. When the fingers occupy the positions in which they are shown in Fig. 32, the operator may place the succeeding sheet to be duplicated on the guide plate 585 whereupon it will gravitate down against the fingers 576 and will be held in this position until the fingers are retracted. When the fingers are retracted, the sheet will gravitate down to the margin bar 551. This construction makes it unnecessary for the operator to feed the paper into the machine at a certain time during each revolution of the duplicating drum.

It will be noted that the margin bar 551 permits the forward end of the paper being duplicated to project beyond the forward end of the duplicating surface of the duplicating band. This projecting portion of the paper is utilized in the operation of stripping the duplicated sheet from the duplicating band.

Figure 38:
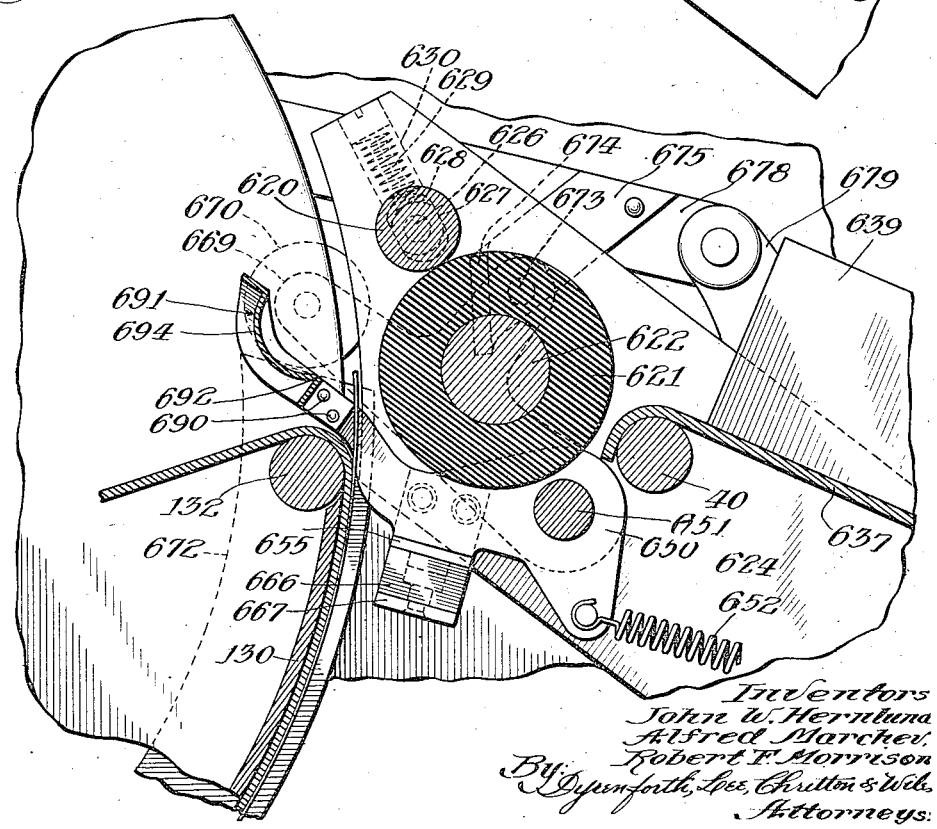
Fig. 38 is a section taken on the same line as Fig. 37 but showing certain mechanism in a changed position.

The mechanism for stripping the duplicating sheets from the duplicating band and stacking them will now be described. The stripping mechanism comprises a knurled metal roller 620 and a rubber roller 621 (Figs. 2, 37, and 38). The rubber roller 621 is mounted on a shaft 622 which is journaled in two plates 624 and in the side frame 25. The plates 624 are mounted on the tie rods 40 and 41 (Fig. 9). The metal roller 620 has trunnions 626 journaled in blocks 627 which, in turn, are slidably journaled in slots 628 provided in the plates 624. Springs 629 disposed in bores 630 formed in the plates 624 yieldably urge the blocks 627 downwardly to hold the metal roller 620 yieldably in engagement with the rubber roller 621.

The shaft 622 has a pinion 635 fixed to it, which pinion 635 meshes with the gear 395. When the duplicated sheet approaches the position of the rollers 620 and 621, its forward end is deflected outwardly and guided between the rollers so that they will strip it from the duplicating surface and stack it on a tray 637 which has one of its ends resting on the tie rod 40. The paper tray 637 is provided with side flanges 639 which are slotted as at 640 (Fig. 1). A paper stop 641 has means (not shown) slidably mounted in the slots 640 and the paper stop may be brought into a plurality of adjusted positions on the paper tray. When the paper is fed to the paper tray by the stripping rollers 620 and 621, it gravitates down against the stop 641. The side flanges 639 are secured to plates 643 by any suitable means (not shown) and the plates 643 are secured to the side frames 25 and 26. As best shown in Fig. 1, the plates 643 form continuations of the side frames 25 and 26.

The means for guiding the duplicated sheets to the stripping rollers 620 and 621 preferably comprises a pair of levers 650 fixed to a shaft 651 which is journaled in the plates 624. A pair of springs 652 yieldably urge the levers 650 in a counter-clockwise direction (Fig. 37). Movement of the levers 650 in a counter-clockwise direction (Figs. 37 and 38) is limited by lugs 655 formed on the levers 650 and engageable with rubber bumpers 666 carried by brackets 667 which are secured to the plates 624. Fixed to the shaft 651 is a lever 669 which carries a roller 670 (Figs. 9, 37, and 38). The roller 670 is engageable by a cam 672 secured to the disc 126 by the bolts 563. The lever 669 is provided with a pin 673 which is engageable by a lug 674 formed on a bracket 675, which bracket 675 is secured to a link 678 (Fig. 7). One end of the link 678 is pivoted to the free end of a lever 679 which is pivoted by a pin 680 to the side frame 26. The other end of the link 578 is pivoted to the free end of a bifurcated lever 682 which is provided with a hub 683, the hub 683 being journaled on a pin 684 projecting from the inner side of the side frame 26. A handle member 686 is secured to the hub 683. A spring 687 yieldably urges the lever 682 in a clockwise direction (Fig. 7) around the pin 684. Movement of the handle member 686 and also the lever 682 in a clockwise direction (Fig. 7) is limited by a pin 688 projecting from the side frame 26, the pin 688 being engageable by the handle member 686. It will be readily understood that the handle member 686 may be displaced manually into the position wherein it is shown in dotted lines in Fig. 7, so that the lug 674 will engage the pin 673 and displace the lever 669 in a clockwise direction (Fig. 38). Such displacement of the lever 669 will cause the shaft 651 to displace the levers 650 in a clockwise direction (Fig. 38) against the action of the springs 652 to bring the levers 650 into the position indicated in full lines in Fig. 37. When the operator releases the handle member 686, the springs 652 will retract the levers 650 into the positions indicated in full lines in Fig. 38 unless the cam 672 engages the roller 670.

Disposed between the free ends of the levers 650 and secured thereto by rivets 690 is a guide plate 691 which is bent to provide an edge 692 adapted to engage the forward end of the duplicated sheet as illustrated in Fig. 37 to guide the forward end of the sheet between the stripping rollers 620 and 621. It will be noted that the plate 691 is bent to provide an arcuate portion 694 adapted to fit part way around the metal roller 620 when the guide plate 691 is in the position wherein it is shown in Fig. 37.

The operation of the stripping mechanism is substantially as follows. When a sheet 615 is being duplicated and is advanced into the position illustrated in Fig. 38, the cam 672 engages the roller 670 and displaces the levers 650 and the guide plate 691 into the positions wherein they are shown in Fig. 37. During this displacement of the guide plate 691 its edge 692 engages the forward end of the duplicated sheet and deflects it so that it passes between the stripping rollers 620 and 621. The stripping rollers strip the duplicated sheet from the duplicating band and deposit it on the paper tray 637. A plurality of sheet metal fingers 700 guide the duplicated sheets from the stripping rollers to the paper tray. The fingers 700 project from blocks 701 slidably journaled on a bar 702. Each block 701 is provided with a bore 704 in which a steel ball 705 and a spring 706 are mounted, the spring being adapted to urge the ball into frictional engagement with the bar 702. This construction permits the operator to slide the blocks 701 into any position desired upon the bar 702 and the friction of the balls 705 on the bar 702 holds the fingers 700 in their adjusted positions.

The ends of the bar 702 are round in crosssection and are journaled in plates 710 and 711 which are fixed to the side frames 26 and 25, respectively. A lever 712 fixed to the bar 702 has means 713 at its free end, which means 713 yieldably engages depressions 714 formed in the plate 711. It will be readily understood that the lever 712 may be displaced manually to bring the bar 702 and the fingers 700 into a plurality of adjusted positions, the fingers being retained in their adjusted positions by the means 713 which engages one of the depressions 714.

Referring now to Fig. 5, it will be noted that a hand wheel 725 is pinned to the stub shaft 127 and that a knob 726 is fixed to the outer end of the stub shaft 128. The hand wheel 725 and the knob 726 are utilized by the operator when the duplicating drum is rotated manually.

As best shown in Figs. 1, 13, and 15, the shaft 306 which carries the foot treadles, is journaled in bearing members 728 and 729 secured to the lower part of the cabinet 10.

The operation of the improved duplicating machine is substantially as follows. If it is assumed that the duplicating drum 50 is not provided with a duplicating band and that the operator wishes to provide it with a duplicating band, it will be readily understood that the operator may place a loaded spindle 18 between the pins 51 and 56 (Figs. 6 and 8). The operator then takes an empty spindle 18 and attaches the outer end of the duplicating band to it. The operator then places the spindle in the upper position of the drum 50 and allows the spindle to rotate under power while holding a finger gently on the band to insure that it will be wound snugly on the spindle. This operation is illustrated in Fig. 8 where a loaded spindle 18 is shown in dotted lines and the outer end of the duplicating band is shown in dotted lines extending to the uppermost spindle 18 in the duplicating drum 50. The operator then depresses the foot treadle 400 momentarily, whereupon the duplicating drum rotates through 360° and returns to the position wherein it is illustrated in Fig. 8, it being understood that a layer of the duplicating band will then extend around the platen plate 130. The operator then removes the loaded spindle from between the pins 51 and 56 and places it in the position occupied by the lowermost spindle 18 shown in the duplicating drum in Fig. 8. The operator then depresses the pedal 309 for a moment to advance the band, which operation results in the slack being taken up in the band. After the slack has been taken up, the operator depresses the foot treadle 310 while holding the foot treadle 309 in its lowermost position. When the band has been drawn taut, the operator releases the foot treadles 309 and 310.

The hectograph master may then be fed to the duplicating band by the feed mechanism which comprises the platen roller 500 and the margin bar 551. If it is desired to leave the hectograph master on the duplicating band through more than one revolution of the duplicating drum, the handle member 686 is moved to the position wherein it is shown in dotted lines in Fig. 7 to prevent actuation of the stripping rollers 620 and 621. After the hectograph master has been left in contact with the duplicating band as long as desired, the handle member 686 is released so that the stripping rollers may strip the master from the duplicating band. The operator then feeds the sheets to be duplicated one by one onto the guide plate 585 in the manner described above and holds the foot treadle 400 depressed so that the duplicating drum rotates continuously. However, if it is so desired, the foot treadle 400 may be depressed momentarily to obtain a single revolution of the duplicating drum.

After the desired number of copies have been made from any impression on the duplicating band, the band is advanced and stretched in the manner described above to present a fresh duplicating surface.

When the entire duplicating band has been used and it is desired to rewind it on another spindle 18, the latter spindle 18 is placed between the pins 51 and 56 and the outer end of the duplicating band mounted on the upper spindle 18 in Fig. 8 is attached to the spindle disposed between the pins 56 and 51. The knob 98 is then manipulated to engage the clutch jaws 83 and 84 as illustrated in Fig. 6. The spindle 18 placed between the pins 56 and 51 is then rotated through the shafts 69 and 62 and the gears 60, 61, 66, and 68. When the band has been rewound in this manner, a fresh roll is inserted between the pins 51 and 56 and loaded on the duplicating drum in the manner described above.

When the operator desires to rotate the duplicating drum manually, it is only necessary to manipulate the knob 108 to disengage the pin 111 from the slot 110.

The knob 108 must be manipulated prior to the winding operation to withdraw the pin 111 from the slot 110.

While we have shown and described certain embodiments of our invention, it is to be understood that it is capable of many modifications. Changes, therefore in the construction and arrangement may be made without departing from the spirit and scope of the invention as disclosed in the appended claims, in which it is our intention to claim all novelty inherent in our invention as broadly as possible, in view of the prior art.

We claim:

1. In a duplicating machine, a frame, a duplicating drum rotatably journaled in said frame, means for rotating said duplicating drum, a margin bar, a feed table over which sheets to be duplicated gravitate to said margin bar, a platen roller cooperating with said duplicating drum and disposed between said margin bar and said feed table, a movably mounted paper stop between said platen roller and said feed table, and means actuated in synchronism with said duplicating drum to displace said paper stop into and out of its functionally operative position.

2. In a duplicating machine, a frame, a duplicating drum rotatably journaled in said frame, means for rotating said drum, a movably mounted margin bar, a feed table over which sheets to be duplicated gravitate to said margin bar, a platen roller cooperating with said duplicating drum and disposed between said margin bar and said feed table, a movably mounted paper stop disposed between said platen roller and said feed table, and means actuated in synchronism with said duplicating drum to displace said margin bar and said paper stop into and out of their functionally operative positions.

3. In a duplicating machine, a frame, a duplicating drum rotatably journaled in said frame, means for rotating said drum, a feed table over which sheets to be duplicated advance to said drum, a paper stop for preventing said sheets from being advanced to said drum until a predetermined point in the rotation of said drum, means actuated in synchronism with said drum for displacing said paper stop into and out of its functionally operative position, and a movable member for actuating counting mehranism, said movable member being disposed in a position wherein it will be displaced by said paper stop when said paper stop is displaced into its functionally operative position and engages a sheet to be duplicated during this displacement, said paper stop passing by said movable member when there is no sheet being fed to said duplicating drum.

4. In a duplicating machine, a frame, a duplicating drum rotatably journaled in the frame, an electric motor, a rotatable pawl-carrying member whereby said pawl rotates bodily around the axis of rotation of said drum, said drum being constrained to rotate in unison with said pawl, a toothed member engageable by said pawl, rotatable means driven by said motor, a resilient member connecting said toothed member and said rotatable means whereby said toothed member is rotated by said rotatable means, and means to bring said pawl into and out of engagement with said toothed member.

5. In a duplicating machine, a frame, a duplicating drum rotatably journaled in the frame, an electric motor, a rotatable pawl-carrying member whereby said pawl rotates bodily around the axis of rotation of said drum, said drum being constrained to rotate in unison with said pawl, a toothed member engageable by said drum, rotatable means driven by said motor, a resilient member connecting said toothed member and said rotatable means whereby said toothed member is rotated by said rotatable means, means for limiting angular displacement between said toothed member and said driven member, and means to bring said pawl into and out of engagement with said toothed member.

6. In a duplicating machine, a frame, a duplicating drum mounted in the frame, said duplicating drum being provided with an arcuate duplicating surface, the ends of said surface being spaced from each other to provide an opening into the drum, a roller at one end of said duplicating surface, two spindles rotatably journaled in said drum, a duplicating band extending from one of said spindles over said roller and said duplicating surface to the other of said spindles, and means for driving said roller and one of said spindles.

7. In a duplicating machine, a frame, a duplicating drum mounted in the frame, said duplicating drum being provided with an arcuate duplicating surface, the ends of said surface being spaced from each other to provide an opening into the drum, a roller at one end of said duplicating surface, two spindles rotatably journaled in said drum, a duplicating band extending from one of said spindles over said roller and said duplicating surface to the other of said spindles, means for driving said roller and one of said spindles, and means for preventing rotation of said spindles so that said band is held taut over said duplicating surface.

8. In a duplicating machine, a frame, a duplicating drum mounted in the frame, said duplicating drum being provided with an arcuate duplicating surface, the ends of said surface being spaced from each other to provide an opening into the drum, a roller at one end of said duplicating surface, two spindles rotatably journaled in said drum, a duplicating band extending from one of said spindles over said roller and said duplicating surface to the other of said spindles, means for driving said roller and one of said spindles, pawl and ratchet means for preventing rotation of said driven spindle in one direction, and a brake for preventing rotation of the other of said spindles.

9. In a duplicating machine, a frame, a duplicating drum mounted in the frame, said duplicating drum being provided with an arcuate duplicating surface, the ends of said surface being spaced from each other to provide an opening into the drum, a roller at one end of said duplicating surface, two spindles rotatably journaled in said drum, a duplicating band extending from one of said spindles over said roller and said duplicating surface to the other of said spindles, and means for driving said roller and said spindles, said driving means including means which will yield when the band is under a predetermined tension.

10. In a duplicating machine, a frame, a duplicating drum mounted in the frame, said duplicating drum being provided with an arcuate duplicating platen, two spindles rotatably journaled in said drum, a duplicating band extending from one of said spindles over said duplicating surface to the other of said spindles, and means for driving one of said spindles, said driving means comprising a spring which will yield when said band is subjected to a predetermined tension.

11. In a duplicating machine, a frame, a duplicating drum mounted in the frame, said duplicating drum being provided with an arcuate duplicating platen, two spindles rotatably journaled in said drum, a duplicating band extending from one of said spindles over said duplicating surface to the other of said spindles, means for driving one of said spindles, said driving means comprising means which will yield when said band is subjected to a predetermined tension, pawl and ratchet means for preventing rotation of said driven spindle, and a brake for preventing rotation of the other of said spindles.

12. In a duplicating machine, a platen, a rotatably journaled spindle, a second rotatably journaled spindle, a duplicating band extending from the first-mentioned spindle over said platen to said second spindle, the ends of said band being secured to said spindles, means for driving the first-mentioned spindle, a brake for preventing rotation of said second spindle, a plurality of springs for actuating said brake, means to cause one of said springs to become functionally operative after a desired amount of the band has been wound around the first-mentioned spindle, and means to cause another of said springs to become functionally operative after said band has been drawn taut across said platen.

13. In a duplicating machine, a platen, a rotatably journaled spindle, a second rotatably journaled spindle, a duplicating band extending from the first-mentioned spindle over said platen to said second spindle, the ends of said band being secured to said spindles, means for driving the first-mentioned spindle, a brake for preventing rotation of said second spindle, a plurality of springs for actuating said brake, manually controlled means to cause one of said springs to become functionally operative after a desired amount of the band has been wound around the first-mentioned spindle, and manually controlled means to cause another of said springs to become functionally operative after said band has been drawn taut across said platen.

14. In a duplicating machine, a platen, a rotatably journaled spindle, a second rotatably journaled spindle, a duplicating band extending from the first-mentioned spindle over said platen to said second spindle, the ends of said band being secured to said spindles, an electric motor, apparatus driven by said motor for driving the first-mentioned spindle, said apparatus being adjustable to first drive the first-mentioned spindle to advance said band over said platen and to then drive said first-mentioned spindle to draw the band taut over said platen, a brake for holding said second spindle against rotation during and after the time said band is being drawn taut across said platen, a pair of springs to control said brake, means to cause one of said springs to actuate said brake when said band is being drawn taut, the other spring being functionally inoperative at this time, and means to actuate said other spring after said band has been drawn taut.

15. In a duplicating machine, a frame, a duplicating drum journaled in said frame, said duplicating drum having an arcuate duplicating platen, means for driving said drum, a spindle rotatably journaled in said drum, a second spindle rotatably journaled in said drum, a duplicating band extending from the first-mentioned spindle over said platen to said second spindle, means for driving the first-mentioned spindle, a brake for preventing rotation of said second spindle, a plurality of springs for actuating said brake, means to cause one of said springs to become functionally operative after a desired amount of the band has been wound around the first-mentioned spindle, and means to cause another of said springs to become functionally operative after said band has been drawn taut across said platen.

16. In a duplicating machine, a frame, a duplicating drum rotatably journaled in the frame and provided with an arcuate platen, a duplicating member carried by said platen, means for driving said drum in a predetermined direction, means for feeding sheets to be duplicated to said duplicating member with the forward edges of the sheets projecting beyond the forward edge of the platen, a pair of stripping rollers journaled in said frame, means for driving at least one of said stripping rollers in synchronism with said duplicating drum, a guide member movably mounted in said frame and movable into said drum to engage the projecting forward edges of said sheets as the drum revolves, means for actuating said guide member to cause it to displace the forward edges of said sheets to said stripping rollers, and means for retaining said guide member in a functionally inoperative position while said drum rotates through a plurality of revolutions.

17. In a duplicating machine, a frame, a duplicating drum rotatably journaled in the frame, an electric motor, means operatively connecting said motor to said drum whereby said motor drives said drum, means including a foot treadle for controlling said connecting means, a pair of spindles rotatably journaled in said drum, a duplicating band extending from one of said spindles over a portion of said drum to the other of said spindles, means actuated by said motor for rotating one of said spindles to advance and tighten the band, and means including a plurality of foot treadles for controlling said advancing and tightening means.

18. In a duplicating machine, a frame, a duplicating drum rotatably journaled in the frame, an electric motor, means operatively connecting said motor to said drum whereby said motor drives said drum, means including a foot treadle for controlling said connecting means, a pair of spindles rotatably journaled in said drum, a duplicating band extending from one of said spindles over a portion of said drum to the other of said spindles, means actuated by said motor for rotating one of said spindles to advance and tighten the band, means including a plurality of foot treadles for controlling said advancing and tightening means, and releasable means locking said last-mentioned foot treadles to each other.

19. In a duplicating machine, a frame, a duplicating drum rotatably journaled in the frame, an electric motor, means operatively connecting said motor to said drum whereby said motor drives said drum, means including a foot treadle for controlling said connecting means, a pair of spindles rotatably journaled in said drum, a duplicating band extending from one of said spindles over a portion of said drum to the other of said spindles, means actuated by said motor for rotating one of said spindles to advance and tighten the band, means including a plurality of foot treadles for controlling said advancing and tightening means, and means including a spring-pressed pawl locking said last-mentioned foot treadles to each other.

20. In a duplicating machine, a frame, a duplicating drum rotatably journaled in the frame, an electric motor, means operatively connecting said motor to said drum whereby said motor drives said drum, means for controlling said connecting means, a pair of spindles rotatably journaled in said drum, a duplicating band extending from one of said spindles over a portion of said drum to the other of said spindles, means actuated by said motor for rotating one of said spindles to advance and tighten the band, means including a plurality of foot treadles for controlling said advancing and tightening means, and means releasably locking said foot treadles to each other whereby displacement of one of said foot treadles in one direction will cause similar displacement of the other foot treadle in the same direction.

21. In a duplicating machine, a frame, a duplicating drum rotatably journaled in the frame, an electric motor, means operatively connecting said motor to said drum whereby said motor drives said drum, means for controlling said connecting means, a pair of spindles rotatably journaled in said drum, a duplicating band extending from one of said spindles over a portion of said drum to the other of said spindles, means actuated by said motor for rotating one of said spindles to advance and tighten the band, and means including a plurality of independently movable foot treadles for controlling said advancing and tightening means, said foot treadles being disposed for engagement simultaneously by a foot of the operator.

22. In a duplicating machine, a frame, a duplicating drum rotatably journaled in the frame, an electric motor, means operatively connecting said motor to said drum whereby said motor drives said drum, means for controlling said connecting means, a pair of spindles rotatably journaled in said drum, a duplicating band extending from one of said spindles over a portion of said drum to the other of said spindles, means actuated by said motor for rotating one of said spindles to advance and tighten the band, means including a plurality of independently movable foot treadles for controlling said advancing and tightening means, and means for releasably locking said foot treadles to each other.

23. In a duplicating machine, a frame, a duplicating drum rotatably journaled in the frame, an electric motor, a rotatable pawl-carrying member whereby said pawl rotates bodily around the axis of said drum, said drum being constrained to rotate in unison with said pawl, a toothed member engageable by said pawl, rotatable means driven by said motor, a resilient member connecting said toothed member and said rotatable means whereby said toothed member is rotated by said rotatable means, a lever pivoted in said frame, a block movably mounted on said lever, resilient means between said block and said lever, said block being normally in the path of said pawl to disengage it from said toothed member and said resilient means being compressed when said pawl engages said block, and means for displacing said lever to withdraw said block from the path of said pawl.

24. In a duplicating machine, a frame, a duplicating drum rotatably journaled in the frame, an electric motor, a rotatable pawl-carrying member whereby said pawl rotates bodily around the axis of rotation of said drum, said drum being constrained to rotate in unison with said pawl, a toothed member engageable by said pawl, rotatable means driven by said motor, a resilient member connecting said toothed member and said rotatable means whereby said toothed member is rotated by said rotatable means, a spring acting between said pawl and said pawl-carrying member to engage said pawl with said toothed member, and means to bring said pawl out of engagement with said toothed member.

25. In a duplicating machine, a frame, a duplicating drum rotatably journaled in the frame, an electric motor, a rotatable pawl-carrying member, said drum being constrained to rotate in unison with said pawl-carrying member, a toothed member engageable by said pawl, rotatable means driven by said motor, a resilient member connecting said toothed member and said rotatable means whereby said toothed member is rotated by said rotatable means, and means to bring said pawl into and out of engagement with said toothed member.

26. In a duplicating machine, a frame, a duplicating drum rotatably journaled in the frame, an electric motor, a rotatable pawl-carrying member, said drum being constrained to rotate in unison with said pawl-carrying member, a toothed member engageable by said pawl, rotatable means driven by said motor, a resilient member connecting said toothed member and said rotatable means whereby said toothed member is rotated by said rotatable means, a spring acting between said pawl and said pawl-carrying member to bring said pawl into engagement with said toothed member, means to bring said pawl out of engagement with said toothed member and to prevent said drum from rotating in a predetermined direction, and means for preventing said drum from rotating in the opposite direction.

27. In a duplicating machine, a frame, a platen plate mounted in said frame, means for rotatably journaling a spindle adjacent said platen plate, a second means for rotatably journaling a second spindle adjacent said platen plate whereby a duplicating band may extend from the first-mentioned spindle to said second spindle over said platen plate, an electric motor, means actuated by said electric motor to drive one of said spindles through one of said journaling means to advance said duplicating band over said platen plate, a third means in said frame for rotatably journaling one of said spindles or a spindle interchangeable therewith, and means actuated by said electric motor for driving said third journaling means to wind said duplicating band on the spindle journaled by said third journaling means.

28. In a duplicating machine, a frame, a platen member rotatably journaled in said frame, means carried by said platen member for rotatably journaling a spindle, a second means carried by said platen member for rotatably journaling a second spindle whereby a duplicating band may extend from one of said spindles to the other of said spindles, an electric motor, means actuated by said electric motor for driving one of said spindles through one of said journaling means to wind said duplicating band thereon, a third means in said frame for rotatably journaling one of said spindles or a spindle interchangeable therewith, and means actuated by said electric motor for driving said third journaling means to wind said duplicating band on the spindle journaled by said third journaling means.

JOHN W. HERNLUND.
ALFRED MARCHEV.
ROBERT F. MORRISON.